United States Patent
Takeyama

(10) Patent No.: US 9,001,413 B2
(45) Date of Patent: Apr. 7, 2015

(54) CONTROL CIRCUIT, CONTROL METHOD, AND TRANSMISSION SYSTEM

(71) Applicant: Fujitsu Limited, Kawasaki-shi, Kanagawa (JP)

(72) Inventor: Tomoaki Takeyama, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/898,547

(22) Filed: May 21, 2013

(65) Prior Publication Data

US 2013/0314768 A1    Nov. 28, 2013

(30) Foreign Application Priority Data

May 23, 2012    (JP) .................................. 2012-117925

(51) Int. Cl.
*H01S 3/30* (2006.01)
*H04B 10/079* (2013.01)
*H04B 10/291* (2013.01)

(52) U.S. Cl.
CPC .............. *H01S 3/30* (2013.01); *H04B 10/0797* (2013.01); *H04B 10/2916* (2013.01)

(58) Field of Classification Search
USPC ....................................... 359/334, 341.4, 337
See application file for complete search history.

(56) References Cited

U.S. PATENT DOCUMENTS

| 7,031,049 B2 * | 4/2006 | Kamada et al. ................ 359/334 |
| 2004/0252999 A1 | 12/2004 | Onaka et al. |
| 2006/0274402 A1 * | 12/2006 | Ghera et al. ................... 359/334 |

FOREIGN PATENT DOCUMENTS

| JP | 10-73852 | 3/1998 |
| JP | 2001-7768 | 1/2001 |

OTHER PUBLICATIONS

Howard Kidorf et al., "Pump Interactions in a 100-nm Bandwidth Raman Amplifier", IEEE Photonics Technology Letters, vol. 11, No. 5 (May 1999) pp. 530-532.

* cited by examiner

*Primary Examiner* — Mark Hellner
(74) *Attorney, Agent, or Firm* — Staas & Halsey LLP

(57) ABSTRACT

There is provided a control circuit for a transmission system in which signal light transmitted from a transmission-side apparatus via a transmission path to a reception-side apparatus is subjected to Raman amplification by inputting excitation light from the reception-side apparatus to the transmission path. The control circuit includes a first detection unit configured to detect a change amount of an optical loss of the transmission path caused by a state change of the transmission path, a second detection unit configured to detect a backscattered light amount of the excitation light, and a control unit configured to control an intensity of the excitation light input by the reception-side apparatus to the transmission path on the basis of the change amount of the optical loss detected by the first detection unit and the backscattered light amount detected by the second detection unit.

9 Claims, 24 Drawing Sheets

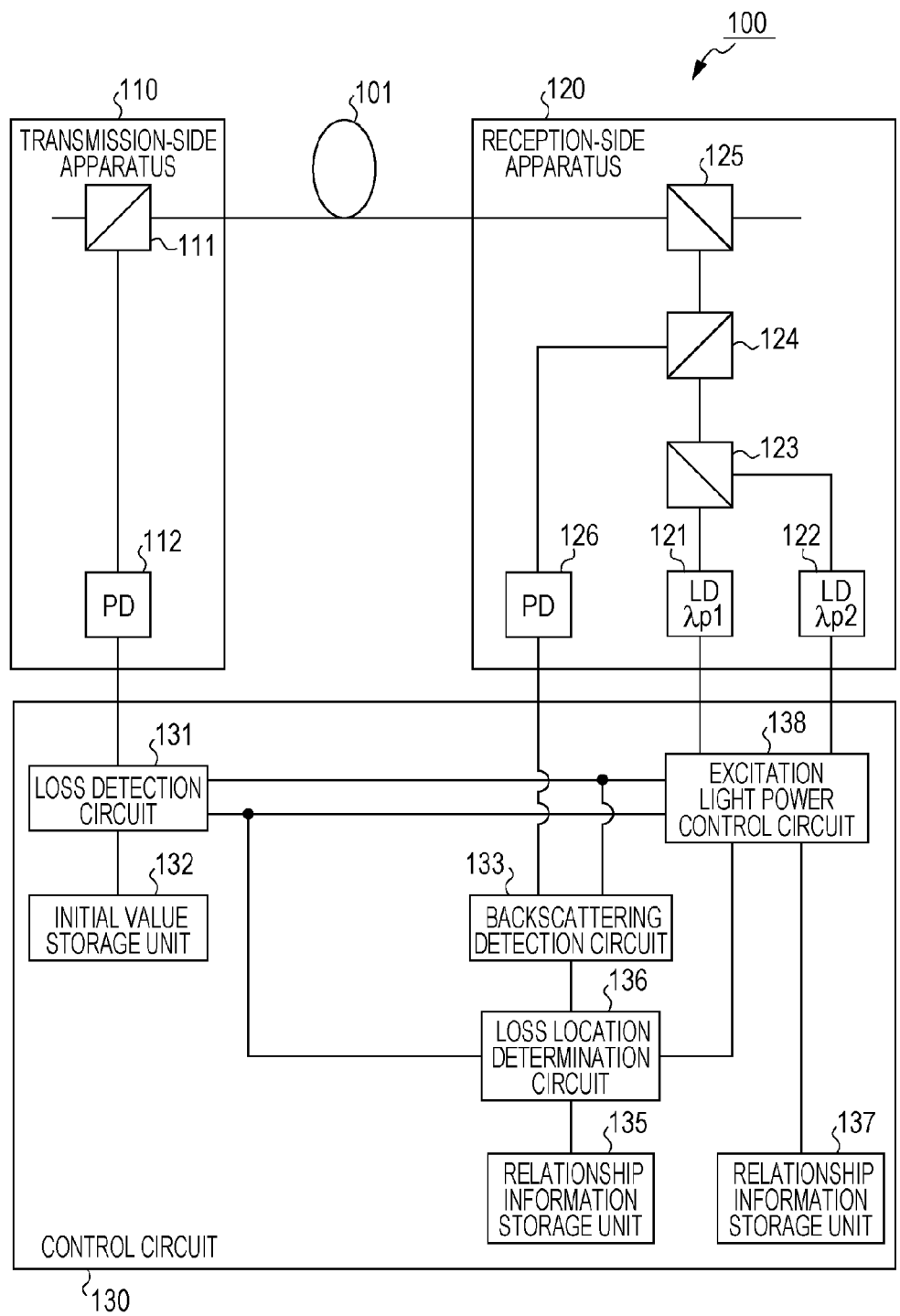

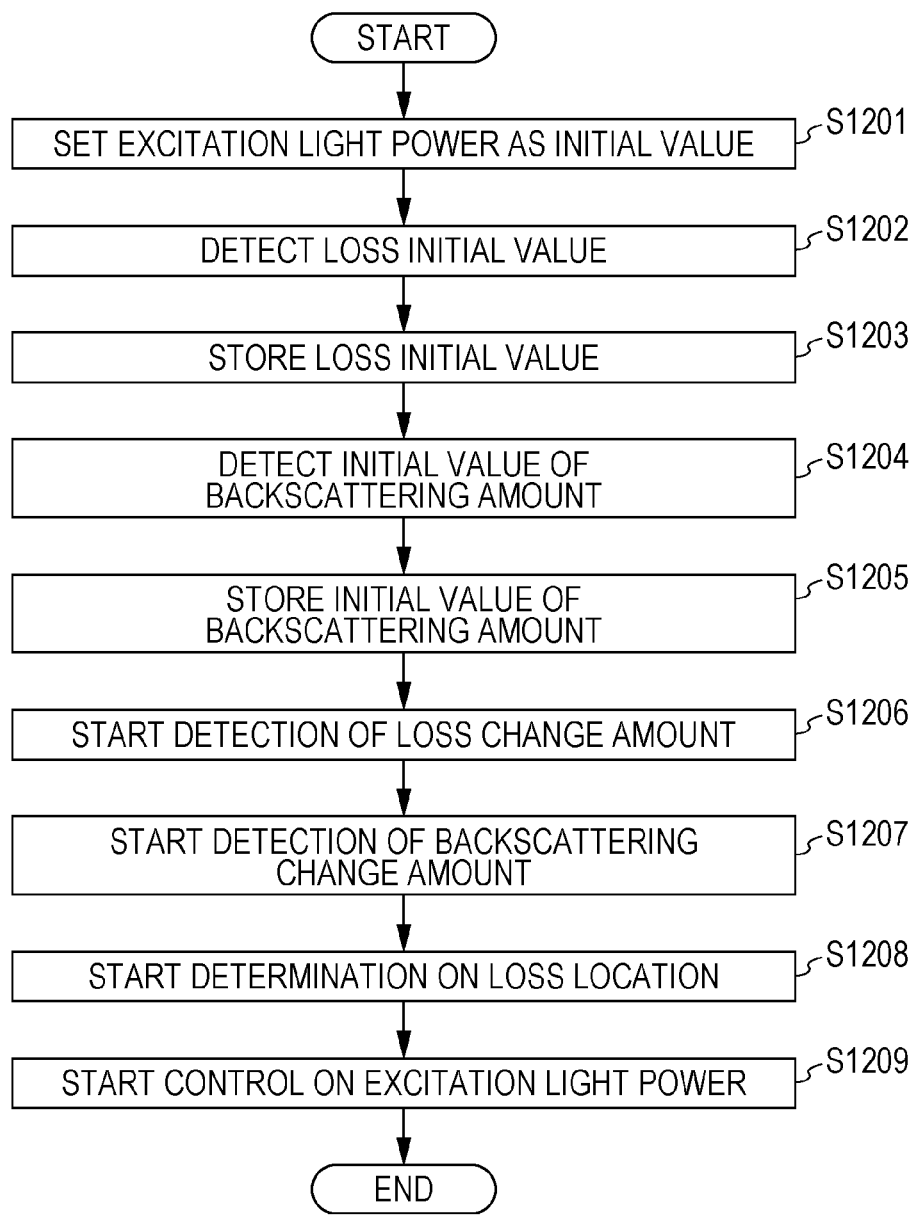

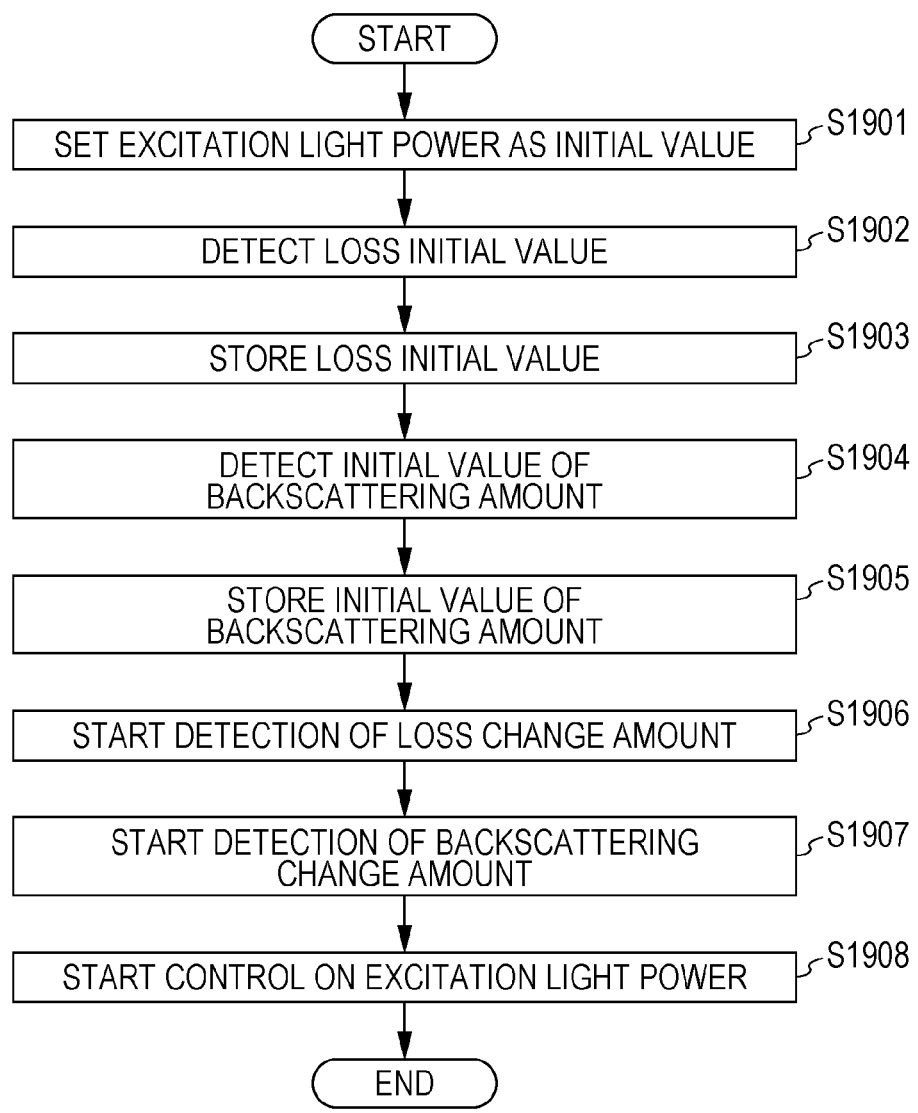

CONTROL CIRCUIT, CONTROL METHOD, AND TRANSMISSION SYSTEM

CROSS-REFERENCE TO RELATED APPLICATION

This application is based upon and claims the benefit of priority of the prior Japanese Patent Application No. 2012-117925, filed on May 23, 2012, the entire contents of which are incorporated herein by reference.

FIELD

The embodiments discussed herein are related to a control circuit, a control method, and a transmission system.

BACKGROUND

Up to now, in a wavelength division multiplexing (WDM) transmission system, an erbium doped fiber amplifier (EDFA) is used with which wide spectrum bands may be amplified collectively.

In the transmission system using the EDFA, a degradation in an optical signal noise ratio (OSNR) which is caused by amplified spontaneous emission (ASE) light generated in the EDFA is one of bottlenecks in terms of a transmission performance.

Examples of an optical amplifier include a Raman amplifier in addition to the EDFA. The Raman amplifier has lower excitation light conversion efficiency than that of the EDFA, but the degradation in the OSNR is small. While a cost of an excitation laser diode (LD) is decreased, the Raman amplifier is widely used in recent years. In the Raman amplifier, to obtain a flat gain with respect to the wide spectrum bands, a technology of inputting excitation lights having plural different wavelengths in a transmission path is proposed.

Since a Raman gain in the Raman amplifier hardly relies on a signal wavelength number or a signal level, if an optical loss of the transmission path does not change, a flat gain wavelength characteristic is maintained by setting powers of the excitation lights having the plural wavelengths to be fixed.

See Japanese Laid-open Patent Publication No. 2001-7768 and Japanese Laid-open Patent Publication No. 10-73852.

SUMMARY

According to an aspect of the invention, a control circuit for a transmission system in which signal light transmitted from a transmission-side apparatus via a transmission path to a reception-side apparatus is subjected to Raman amplification by inputting excitation light from the reception-side apparatus to the transmission path, the control circuit includes a first detection unit configured to detect a change amount of an optical loss of the transmission path caused by a state change of the transmission path, a second detection unit configured to detect a backscattered light amount of the excitation light, and a control unit configured to control an intensity of the excitation light input by the reception-side apparatus to the transmission path on the basis of the change amount of the optical loss detected by the first detection unit and the backscattered light amount detected by the second detection unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A illustrates a configuration example of a transmission system according to a first embodiment;

FIG. 12 is a flow chart illustrating an example of the rising operation according to the second embodiment;

FIG. 19 is a flow chart illustrating an example of the rising operation according to the fifth embodiment.

DESCRIPTION OF EMBODIMENTS

However, according to the technology in the related art, if the optical loss caused by fiber bending or the like is generated in any location on the transmission path, the Raman gain changes in accordance with the location of the optical loss, and a problem occurs that the wavelength characteristic of the Raman gain fluctuates.

Therefore, it is desired to reduce fluctuation of the wavelength characteristic of the Raman gain to solve the above described disadvantage of the related art.

Hereinafter, with reference to the accompanying drawings, a control circuit, a control method, and a transmission system according to embodiments of the present disclosure will be described in detail.

First Embodiment

Figure 1B:
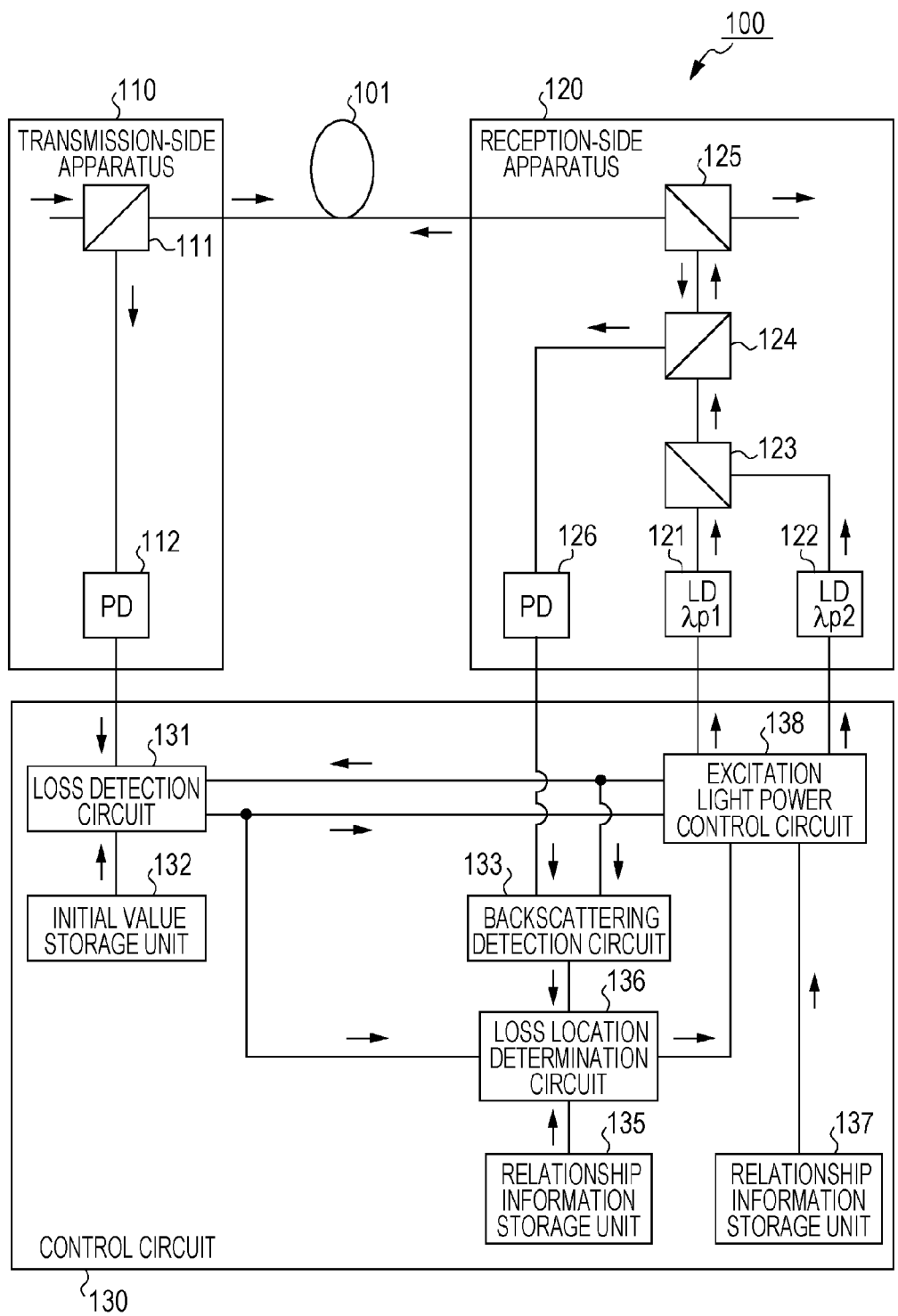
FIG. 1B illustrates an example of flows of light and electric signals in the transmission system illustrated in FIG. 1A.

FIG. 1A illustrates a configuration example of a transmission system according to a first embodiment. FIG. 1B illustrates an example of flows of light and electric signals in the transmission system illustrated in FIG. 1A. As illustrated in FIG. 1A and FIG. 1B, a transmission system 100 includes a transmission-side apparatus 110, a reception-side apparatus 120, and a control circuit 130.

The transmission-side apparatus 110 transmits signal light to the reception-side apparatus 120 via a transmission path 101. The transmission path 101 is composed, for example, of an optical fiber such as single mode fiber (SMF).

The transmission-side apparatus 110 is an optical transmission apparatus configured to convert, for example, an electric signal into signal light to be transmitted. The transmission-side apparatus 110 may alternatively be an optical relay apparatus configured to transmit the signal light transmitted from another optical communication apparatus in the form of light as it is. The reception-side apparatus 120 is an optical reception apparatus configured to receive, for example, the signal light into an electric signal. The reception-side apparatus 120 may alternatively be an optical relay apparatus configured to transmit the signal light transmitted from another optical communication apparatus in the form of light as it is.

The control circuit 130 is a circuit configured to control Raman amplification of the signal light transmitted from the transmission-side apparatus 110 to the reception-side apparatus 120. The control circuit 130 may be provided in the transmission-side apparatus 110 or the reception-side apparatus 120 and may also be provided in an apparatus different from the transmission-side apparatus 110 and the reception-side apparatus 120. The respective function units of the control circuit 130 may also be provided in a disperse manner in plural apparatuses that may communicate with each other.

Transmission-Side Apparatus

The transmission-side apparatus 110 is provided with a branch coupler 111 and a PD 112. The signal light that is to be transmitted from the transmission-side apparatus 110 to the reception-side apparatus 120 is input to the branch coupler 111. The branch coupler 111 outputs the input signal light to the transmission path 101. The signal light output from the branch coupler 111 to the transmission path 101 is transmitted to the reception-side apparatus 120 while passing through the transmission path 101. The branch coupler 111 branches excitation light output from the transmission path 101 to be output to the PD 112.

The photo detector (PD) 112 is configured to receive the excitation light output from the branch coupler 111 and output a signal (electric signal) indicating power (intensity) of the received excitation light to the control circuit 130. An optical circulator may be provided instead of the branch coupler 111 of the transmission-side apparatus 110. The optical circulator of the transmission-side apparatus 110 is configured to output the input signal light to the transmission path 101 and also output the excitation light output from the transmission path 101 to the PD 112. A WDM coupler configured to output an excitation light wavelength only to the PD 112 may be provided instead of the branch coupler 111 of the transmission-side apparatus 110.

Reception-Side Apparatus

The reception-side apparatus 120 is provided with LDs 121 and 122, a multiplexer 123, a branch coupler 124, a multiplexer and demultiplexer 125, and a PD 126. The LDs 121 and 122 are configured to output excitation lights respectively having wavelengths $\lambda p1$ and $\lambda p2$ ($\lambda p1 \neq \lambda p2$) to the multiplexer 123. The powers of the respective excitation lights output from the LDs 121 and 122 are controlled by the control circuit 130.

The multiplexer 123 is configured to multiplex the respective excitation lights output from the LDs 121 and 122 and output the multiplexed excitation light to the branch coupler 124. The branch coupler 124 is configured to output the excitation light output from the multiplexer 123 to the multiplexer and demultiplexer 125. The branch coupler 124 branches backscattered light output from the multiplexer and demultiplexer 125 to be output to the PD 126. The optical circulator may be provided instead of the branch coupler 124 of the reception-side apparatus 120. The optical circulator of the reception-side apparatus 120 is configured to output the excitation light output from the multiplexer 123 to the multiplexer and demultiplexer 125 and output the backscattered light output from the multiplexer and demultiplexer 125 to the PD 126.

The multiplexer and demultiplexer 125 is configured to output the excitation light output from the branch coupler 124 to the transmission path 101. The excitation light output from the multiplexer and demultiplexer 125 to the transmission path 101 is transmitted to the transmission-side apparatus 110 via the transmission path 101. With this configuration, the signal light is amplified by stimulated Raman scattering (SRS) caused while the signal light and the excitation light pass through the transmission path 101 in opposite directions to each other.

The backscattered light based on Rayleigh scattering is generated on the transmission path 101 by inputting the excitation light to the transmission path 101. The backscattered light generated on the transmission path 101 is output to the multiplexer and demultiplexer 125. The multiplexer and demultiplexer 125 demultiplexes the light output from the transmission path 101 into the signal light from the transmission-side apparatus 110 and the backscattered light of the excitation light (wavelength demultiplexing). The multiplexer and demultiplexer 125 outputs the demultiplexed signal light to a subsequent stage. The multiplexer and demultiplexer 125 outputs the demultiplexed backscattered light to the branch coupler 124.

The PD 126 receives the backscattered light output from the branch coupler 124 and outputs a signal (electric light) indicating the power of the received backscattered light to the control circuit 130.

Control Circuit

The control circuit 130 is provided with a loss detection circuit 131 (first detection unit), an initial value storage unit 132, a backscattering detection circuit 133 (second detection unit), a relationship information storage unit 135, a loss location determination circuit 136 (determination unit), a relationship information storage unit 137, and an excitation light power control circuit 138 (control unit). The control circuit 130 may be realized, for example, by a field programmable gate array (FPGA), a central processing unit (CPU), firmware, and the like.

The loss detection circuit 131 is configured to detect a loss amount of the excitation light on the transmission path 101. Specifically, the loss detection circuit 131 obtains excitation light power information indicating total power of the respective excitation lights output from the LDs 121 and 122 from the excitation light power control circuit 138. The loss detection circuit 131 also calculates a difference between the power of the excitation light indicated by the signal that is output from the PD 112 and the power of the excitation light indicated by the excitation light power information to detect the loss amount of the excitation light on the transmission path 101.

The loss detection circuit 131 obtains information indicating an initial value of the loss amount of the excitation light on the transmission path 101 from the initial value storage unit 132. The loss detection circuit 131 calculates a difference between the initial value of the loss amount indicated by the obtained information and the detected loss amount to detect an amount of change (loss change amount) from the initial value of the loss amount of the excitation light on the transmission path 101. The loss detection circuit 131 outputs information indicating the calculated loss change amount to the loss location determination circuit 136 and the excitation light power control circuit 138.

The initial value storage unit 132 stores the initial value of the loss amount of the excitation light on the transmission path 101. For example, the initial value storage unit 132 stores the loss amount detected by the loss detection circuit 131 at the rise of the control circuit 130.

The backscattering detection circuit 133 is configured to detect a backscattering amount of the excitation light generated on the transmission path 101. Specifically, the backscattering detection circuit 133 obtains the excitation light power information indicating the total power of the respective excitation lights output from the LDs 121 and 122 from the excitation light power control circuit 138. The backscattering detection circuit 133 also calculates a difference between the power of the backscattered light indicated by the signal output from the PD 126 and the power of the excitation light indicated by the excitation light power information to detect a backscattering amount. The backscattering detection circuit 133 outputs information indicating the detected backscattering amount to the loss location determination circuit 136.

The relationship information storage unit 135 stores relationship information indicating a relationship between a combination of the loss change amount and the backscattering amount and a location where a loss caused by bending or the like is generated (loss location) on the transmission path 101.

The loss location determination circuit 136 is configured to determine the location where the loss caused by the bending or the like is generated on the basis of the relationship information stored in the relationship information storage unit 135, the loss change amount indicated by the information from the loss detection circuit 131, and the backscattering amount indicated by the information from the backscattering detection circuit 133. The loss location determination circuit 136 outputs information indicating the determined location to the excitation light power control circuit 138.

The relationship information storage unit 137 stores relationship information indicating a relationship between a combination of the loss change amount and the loss location and excitation light power for maintaining the Raman gain as a fixed value. The excitation light power is, for example, total power of the excitation lights output from the LDs 121 and 122.

The excitation light power control circuit 138 derives the excitation light power on the basis of the relationship information stored in the relationship information storage unit 137, the loss change amount indicated by the information from the loss detection circuit 131, and the loss location indicated by the information from the loss location determination circuit 136. The excitation light power control circuit 138 outputs excitation light power information indicating the derived excitation light power to the loss detection circuit 131 and the backscattering detection circuit 133.

The excitation light power control circuit 138 controls the powers of the respective excitation lights output from the LDs 121 and 122 so that the total power of the excitation lights output from the LDs 121 and 122 corresponds to the derived excitation light power. For example, the excitation light power control circuit 138 controls the total power corresponds to the derived power while the powers of the respective excitation lights output from the LDs 121 and 122 are maintained at a certain ratio (for example, 1:1).

The transmission system 100 is thus a transmission system for Raman amplification in which the signal light transmitted from the transmission-side apparatus 110 via the transmission path 101 to the reception-side apparatus 120 is subjected to Raman amplification by inputting the excitation light from the reception-side apparatus 120 to the transmission path 101. The excitation light is obtained by multiplexing plural lights having different wavelengths (wavelengths $\lambda_{p1}$ and $\lambda_{p2}$) with each other.

The control circuit 130 detects a change amount of an optical loss of the transmission path 101 caused by a state change of the transmission path 101 (for example, fiber bending). The control circuit 130 also detects an amount of the backscattered light of the excitation light. The control circuit 130 controls the intensity of the excitation light input to the transmission path 101 by the reception-side apparatus 120 on the basis of the change amount of the detected optical loss and the detected amount of the backscattered light. With this configuration, even when the optical loss caused by the fiber bending or the like occurs in any location on the transmission path 101, it is possible to suppress the fluctuation in the wavelength characteristic of the Raman gain.

The control circuit 130 detects the optical loss of the transmission path 101 on the basis of a difference between the intensity (power) of the excitation light input to the transmission path 101 by the reception-side apparatus 120 and the intensity of the excitation light input to the transmission-side apparatus 110 via the transmission path 101. With this configuration, it is possible to detect the change amount of the optical loss of the transmission path 101.

The control circuit 130 may detect the change amount of the optical loss of the transmission path 101 caused by the state change of the transmission path 101 on the basis of a difference between an optical loss at a first time point (for example, at the rise of the control circuit 130) and an optical loss at a second time point (for example, a current time point in the operation) following the first time point.

The control circuit 130 may detect the amount of the backscattered light on the basis of intensities of wavelength components (components at the wavelengths $\lambda_{p1}$ and $\lambda_{p2}$) of the excitation light among the light input from the transmission path 101 to the reception-side apparatus 120.

The control circuit 130 controls the intensity of the excitation light on the basis of relationship information indirectly indicating a relationship between a combination of the change amount of the optical loss and the amount of the backscattered light (backscattering amount) and the intensity of the excitation light (excitation light power) at which the gain by Raman amplification corresponds to a predetermined gain. With this configuration, even when the optical loss caused by the fiber bending or the like occurs in any location on the transmission path 101, it is possible to suppress the fluctuation in the wavelength characteristic of the Raman gain.

In the example illustrated in FIG. 1A and FIG. 1B, the relationship information indicating the relationship between the combination of the change amount of the optical loss and the amount of the backscattered light and the intensity of the excitation light at which the gain by Raman amplification corresponds to a predetermined gain is realized by the respective pieces of relationship information stored in the relationship information storage units 135 and 137.

Figure 2:
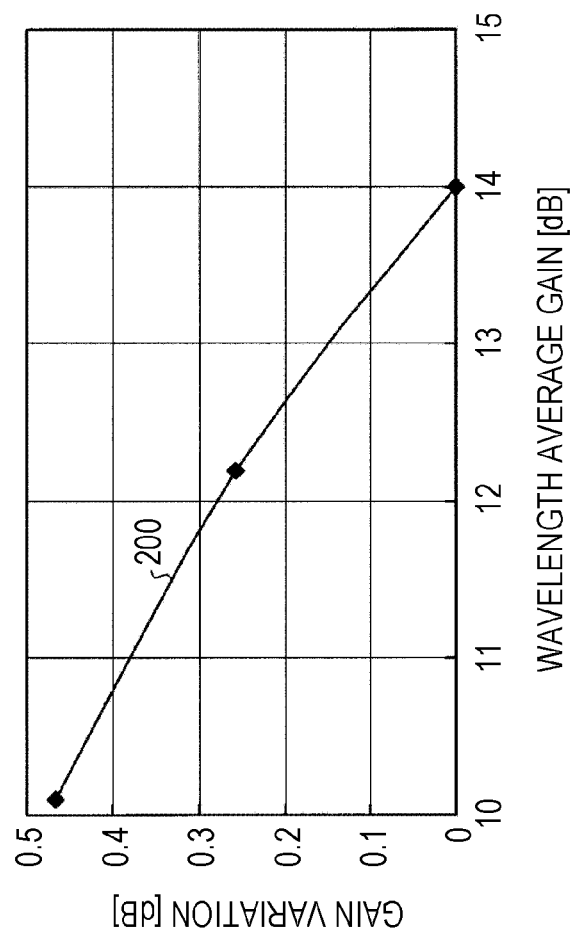
FIG. 2 illustrates an example of a relationship between a wavelength average gain and a gain variation.

FIG. 2 illustrates an example of a relationship between a wavelength average gain and a gain variation. In FIG. 2, a horizontal axis represents the wavelength average gain [dB], and a vertical axis represents the gain variation [dB]. A gain variation characteristic 200 indicates a characteristic example of the gain variation with respect to the wavelength average gain. As represented by the gain variation characteristic 200, the gain variation is higher as the wavelength average gain is lower. Therefore, when the Raman gain is decreased, the gain variation is increased.

Figure 3:
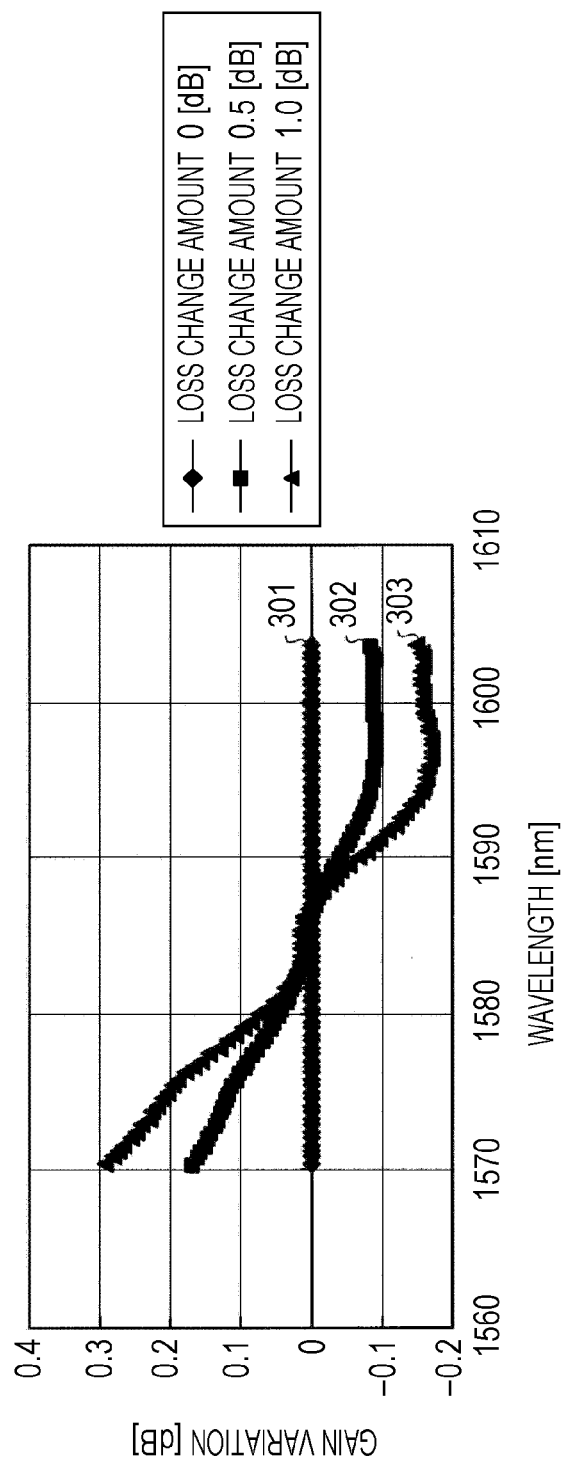
FIG. 3 illustrates an example of a relationship between a wavelength, the gain variation, and a reception-end loss change amount.

FIG. 3 illustrates an example of a relationship between a wavelength, the gain variation, and a reception-end loss change amount. In FIG. 3, a horizontal axis represents the wavelength [nm], and a vertical axis represents the gain variation [dB]. Gain variation characteristics 301 to 303 respectively represent characteristic examples of the gain variation with respect to the wavelength in a case where the loss change amounts caused by the bending or the like of the transmission path 101 in the vicinity of a reception end (the reception-side apparatus 120) of the transmission path 101 are 0 dB, 0.5 dB, and 1.0 dB.

In a case where the loss change amount on the reception end of the transmission path 101 is 0 dB, that is, the loss caused by the bending or the like is not generated on the reception end of the transmission path 101, as represented by the gain variation characteristic 301, the gain variation with respect to the wavelength is fixed. When the loss caused by the bending or the like is generated on the reception end of the transmission path 101, as represented by the gain variation characteristics 302 and 303, the gain variation with respect to the wavelength is not fixed.

In the vicinity of a transmission end (the transmission-side apparatus 110) of the transmission path 101, the excitation light attenuates by the loss of the transmission path 101 and has reduced power at a level where Raman amplification does not occur. For this reason, the Raman gain is barely affected even when the bending or the like of the transmission path 101 exists in the vicinity of the transmission end of the transmission path 101.

Figure 4:
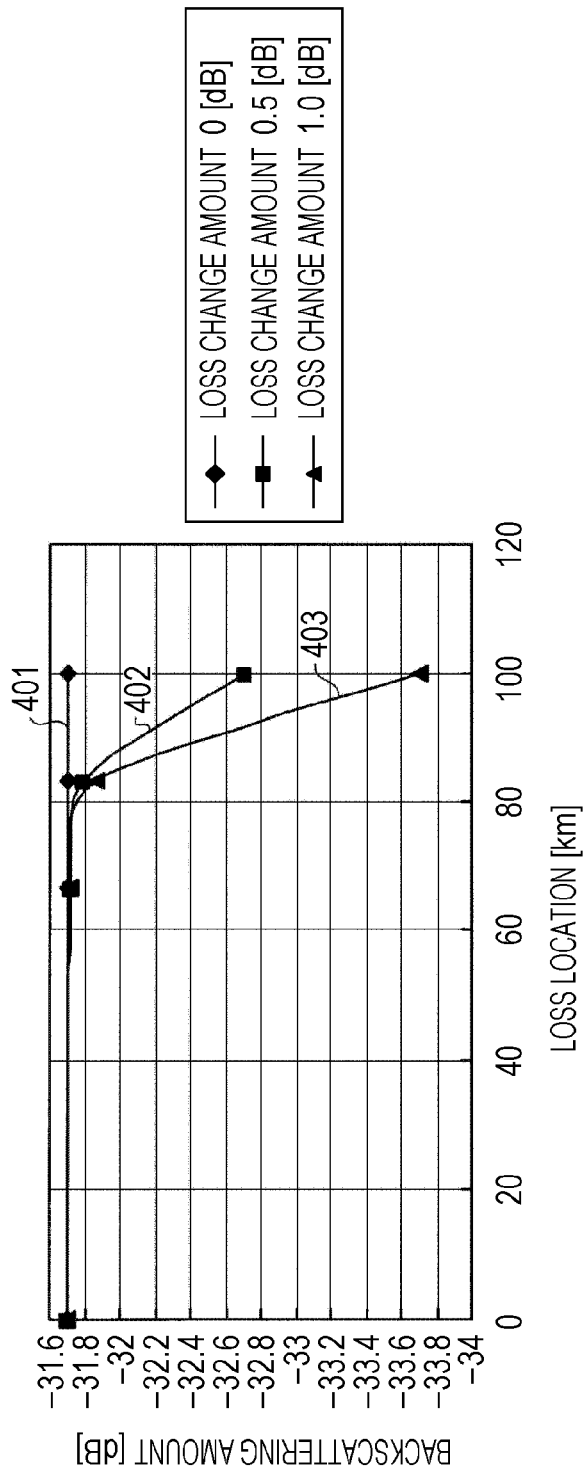
FIG. 4 illustrates an example of a relationship between a loss location, a backscattering amount, and a loss change amount (part 1)
Figure 5:
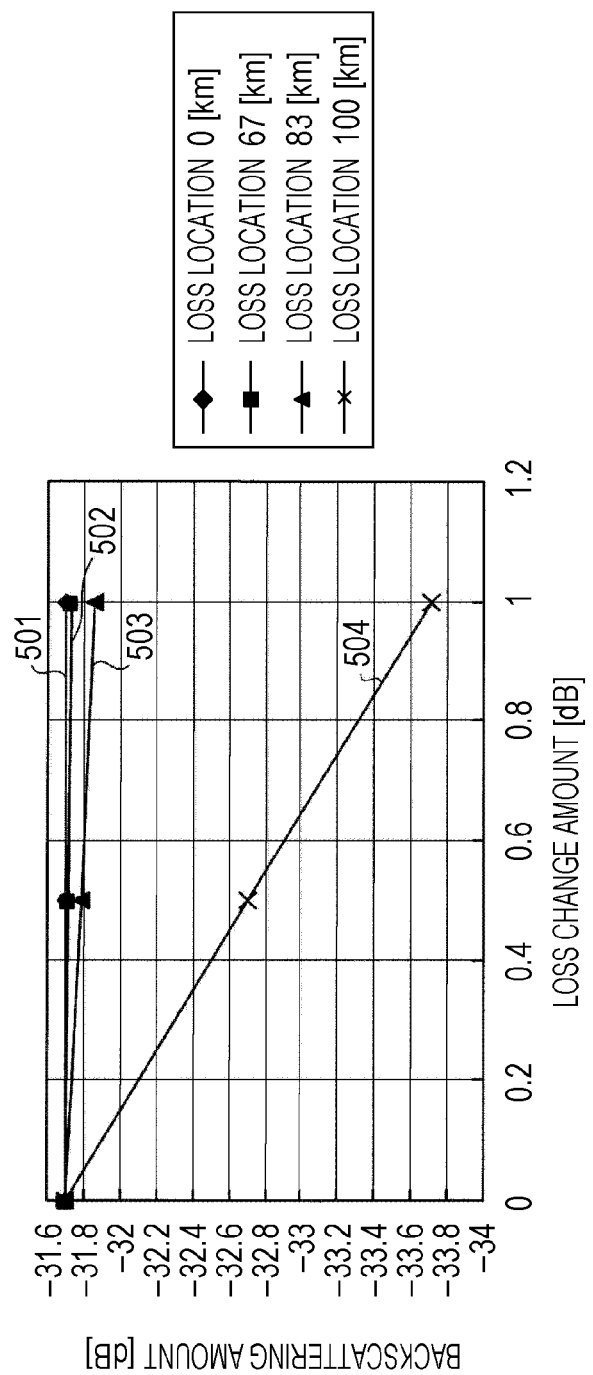
FIG. 5 illustrates an example of the relationship between the loss location, the backscattering amount, and the loss change amount (part 2)

FIG. 4 and FIG. 5 illustrate an example of the relationship between the loss location, the backscattering amount, and the loss change amount. A vertical axis in FIG. 4 and FIG. 5 represents the backscattering amount [dB].

A horizontal axis of FIG. 4 represents the loss location [km] on the transmission path 101 in terms of a distance from the transmission-side apparatus 110. For example, 0 km of the horizontal axis represents the location of the transmission end (the transmission-side apparatus 110). For example, when a length of the transmission path 101 is set as 100 km, 100 km of the horizontal axis represents the location of the reception end (the reception-side apparatus 120). Backscattering amount characteristics 401 to 403 of FIG. 4 respectively represent characteristic examples of the backscattering amount with respect to the loss locations in a case where the loss change amounts are 0 dB, 0.5 dB, and 1.0 dB.

A horizontal axis of FIG. 5 represents the loss change amount [dB]. Backscattering amount characteristics 501 to 504 of FIG. 5 respectively represent characteristic examples of the backscattering amount with respect to the loss change amount in a case where the loss locations are 0 km, 67 km, 83 km, and 100 km.

As illustrated in FIG. 4 and FIG. 5, as the loss location is closer to the reception end, the backscattering amount is decreased. As the loss change amount is increased, the backscattering amount is decreased. Therefore, the loss location is uniquely determined from the combination of the loss change amount and the backscattering amount.

The relationship information storage unit 135 illustrated in FIG. 1A and FIG. 1B stores the relationship information indicating the backscattering amount characteristics 401 to 403 of FIG. 4 or the backscattering amount characteristics 501 to 504 of FIG. 5 in the form of a table or a function. With this configuration, the loss location determination circuit 136 may determine the location where the loss caused by the bending or the like is generated on the basis of the combination of the loss change amount and the backscattering amount and the relationship information stored in the relationship information storage unit 135.

The backscattering amount characteristics 401 to 403 of FIG. 4 or the backscattering amount characteristics 501 to 504 of FIG. 5 may be obtained on the basis of −70 dB/m corresponding to the backscattering amount by Rayleigh scattering of general single mode fiber (SMF).

Figure 6:
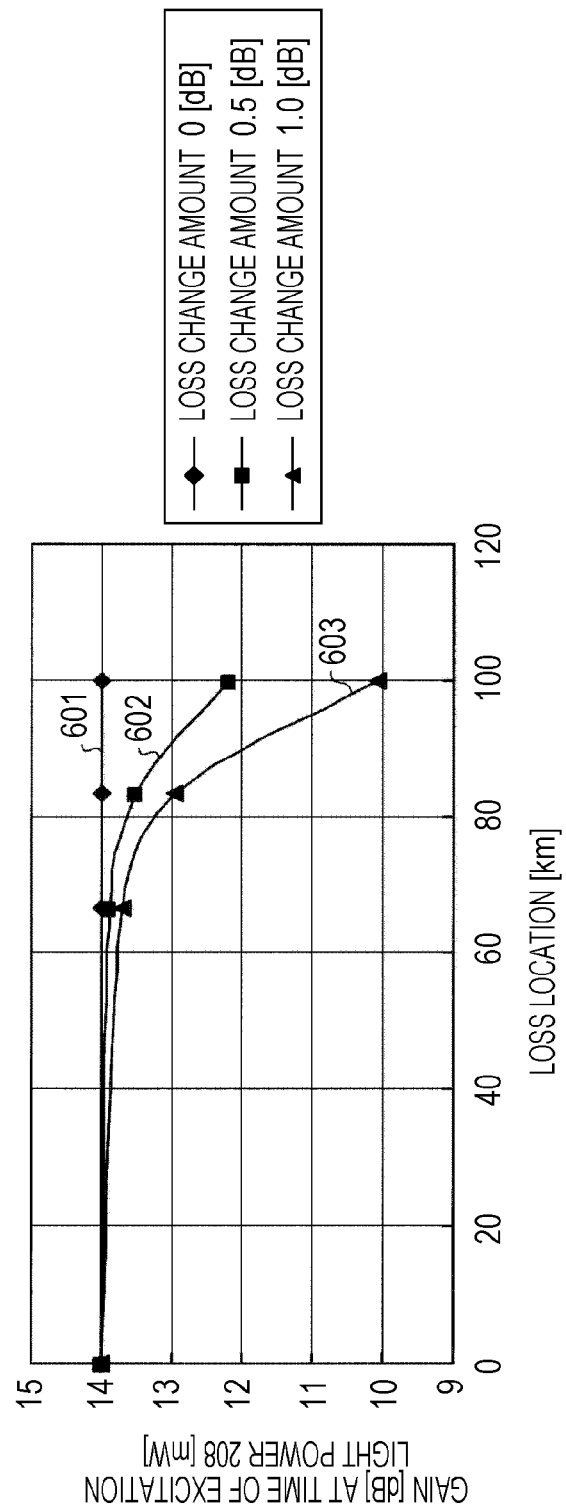
FIG. 6 illustrates an example of a relationship between the loss location, a gain, and the loss change amount (part 1)
Figure 7:
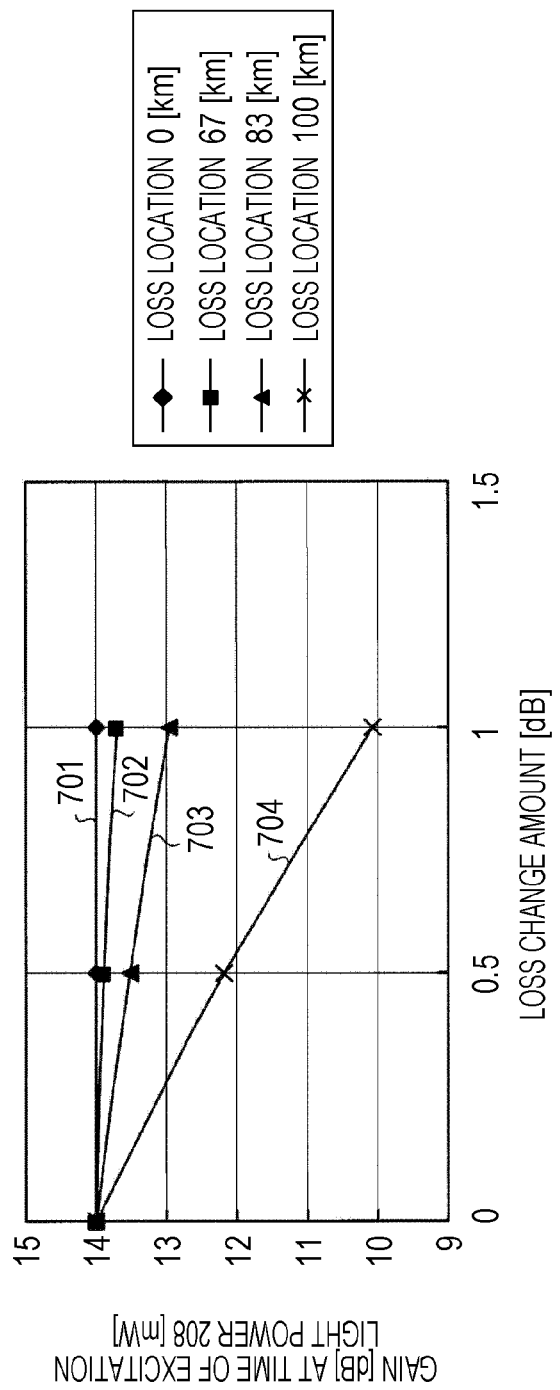
FIG. 7 illustrates an example of a relationship between the loss location, the gain, and the loss change amount (part 2)

FIG. 6 and FIG. 7 illustrate an example of a relationship between the loss location, a gain, and the loss change amount. A vertical axis represents of FIG. 6 and FIG. 7 represents the gain [dB] in a case where the powers of the respective excitation lights of the LDs 121 and 122 are set as 208 mW.

A horizontal axis of FIG. 6 represents the loss location [km]. Gain characteristics 601 to 603 of FIG. 6 respectively represent characteristic examples of the gain with respect to the loss location in a case where the loss change amounts are 0 dB, 0.5 dB, and 1.0 dB. A horizontal axis of FIG. 7 represents the loss change amount [dB]. Gain characteristics 701 to 704 of FIG. 7 respectively represent characteristic examples of the gain with respect to the loss change amount in a case where the loss locations are 0 km, 67 km, 83 km, and 100 km. As illustrated in FIG. 6 and FIG. 7, as the loss location is closer to the reception end, the gain is decreased. As the loss change amount is increased, the gain is decreased.

Figure 8:
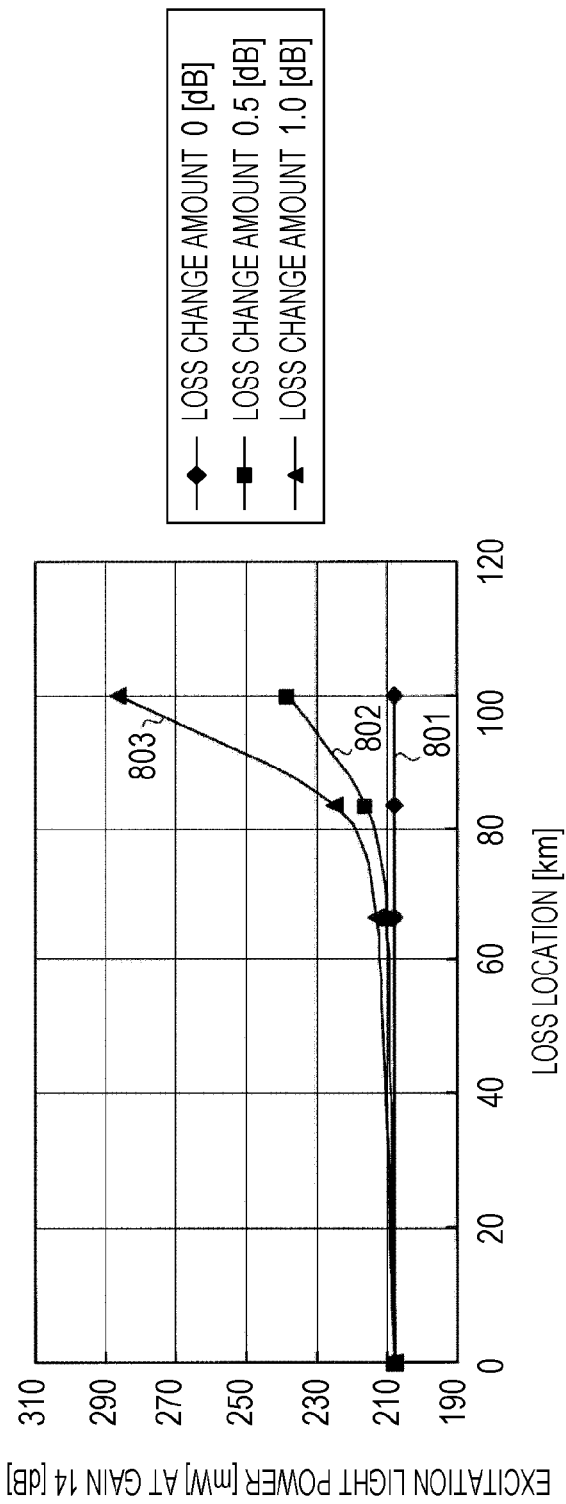
FIG. 8 illustrates an example of a relationship between the loss location, excitation light power, and the loss change amount (part 1)
Figure 9:
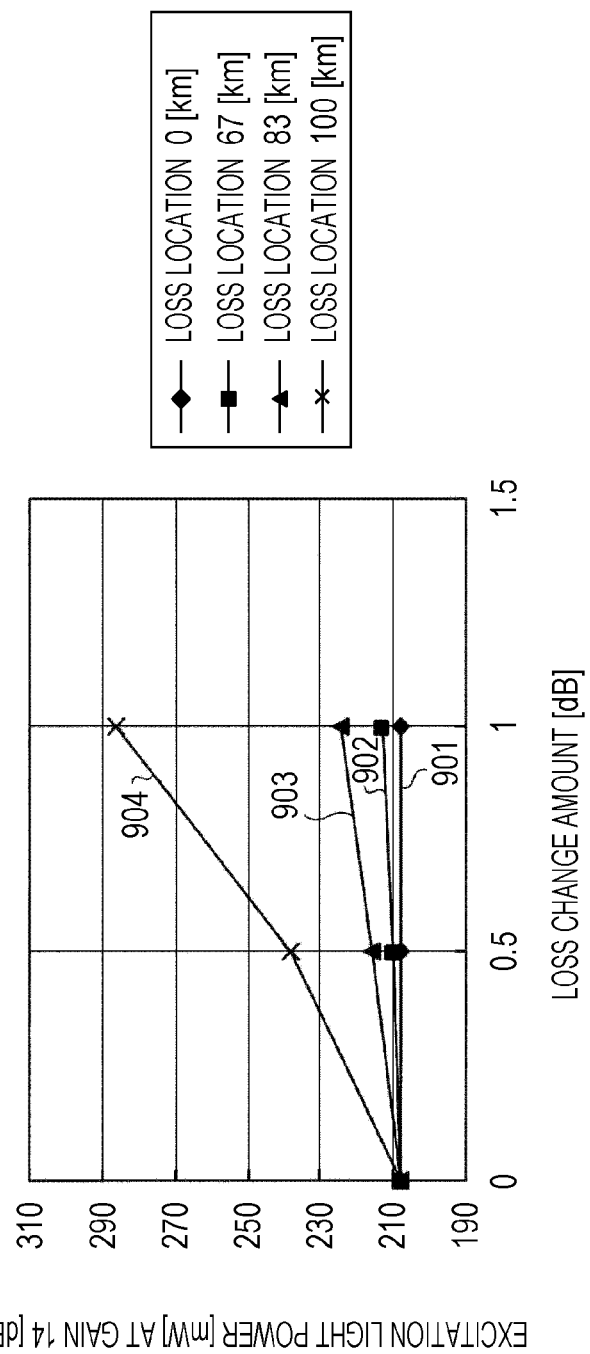
FIG. 9 illustrates an example of a relationship between the loss location, the excitation light power, and the loss change amount (part 2)

FIG. 8 and FIG. 9 illustrate an example of a relationship between the loss location, the excitation light power, and the loss change amount. A vertical axis of FIG. 8 and FIG. 9 represents the excitation light power [mW] for setting the gain to be fixed (14 dB).

A horizontal axis of FIG. 8 represents the loss location [km]. Excitation light powers 801 to 803 of FIG. 8 respectively represent excitation light powers with respect to the loss location in a case where the loss change amounts are 0 dB, 0.5 dB, and 1.0 dB. The excitation light powers 801 to 803 are increased as the loss location is closer to the reception end to compensate the gain characteristics 601 to 603 illustrated in FIG. 6.

A horizontal axis of FIG. 9 represents the loss change amount [dB]. Excitation light powers 901 to 904 of FIG. 9 respectively represent excitation light powers with respect to the loss change amount in a case where the loss locations are 0 km, 67 km, 83 km, and 100 km. The excitation light powers 901 to 904 are increased as the loss change amount is increased to compensate the gain characteristics 701 to 704 illustrated in FIG. 7.

As illustrated in FIG. 8 and FIG. 9, as the loss location is closer to the reception end, the excitation light power for setting the gain to be fixed is increased. As the loss change amount is increased, the excitation light power for setting the gain to be fixed is increased. Therefore, the excitation light power for setting the gain to be fixed is uniquely determined from the combination of the loss change amount and the loss location.

The relationship information storage unit 137 illustrated in FIG. 1A and FIG. 1B stores the relationship information indicating the excitation light powers 801 to 803 of FIG. 8 or the excitation light powers 901 to 904 of FIG. 9 in the format of a table or a function. With this configuration, the excitation light power control circuit 138 may derive the excitation light power for setting the gain to be fixed on the basis of the combination of the loss change amount and the loss location and the relationship information stored in the relationship information storage unit 137.

The excitation light powers 801 to 803 of FIG. 8 or the excitation light powers 901 to 904 of FIG. 9 may be obtained on the basis of an amplification characteristic of Raman amplification and a loss coefficient and a transmission distance of the transmission path 101.

For the amplification characteristic of Raman amplification, for example, it is possible to use an amplification characteristic disclosed in Howard Kidorf, Karsten Rottwitt, Morten Nissov, Matthew Ma, and Eric Rabarijaona, "Pump Interactions in a 100-nm Bandwidth Raman Amplifier", *IEEE PHOTONICS TECHNOLOGY LETTERS*, VOL. 11, NO. 5, May 1999.

Figure 10:
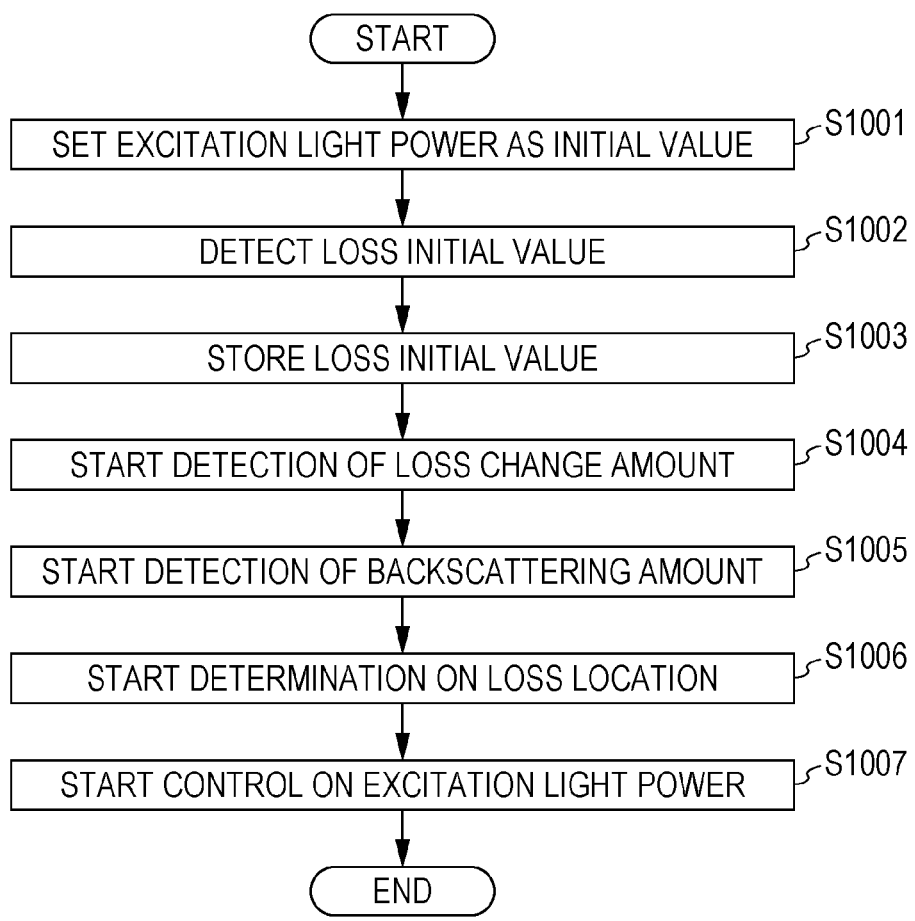
FIG. 10 is a flow chart illustrating an example of a rising operation according to the first embodiment.

FIG. 10 is a flow chart illustrating an example of a rising operation according to the first embodiment. The control circuit 130 according to the first embodiment executes, for example, the following respective steps as a rising operation. The excitation light power control circuit 138 sets the excitation light powers of the LDs 121 and 122 as predetermined initial values (step S1001).

The loss detection circuit 131 detects an initial value of the excitation light loss of the transmission path 101 on the basis of the excitation light powers set in step S1001 and the signal from the PD 112 (step S1002). The initial value storage unit 132 stores the loss initial value detected in step S1002 (step S1003).

The loss detection circuit 131 starts to detect the loss change amount of the excitation light (step S1004). The loss change amount is a change mount of the excitation light loss from the initial value stored in step S1003. The backscattering detection circuit 133 starts to detect the backscattering amount based on the excitation light powers set in step S1001 and the signal from the PD 126 (step S1005).

The loss location determination circuit 136 starts to detect the loss location based on the detection result of the loss change amount which is started in step S1004 and the detection result of the backscattering amount which is started in step S1005 (step S1006).

The excitation light power control circuit 138 starts to control the excitation light powers of the LDs 121 and 122 (step S1007) and ends the series of the rising operation. Specifically, the excitation light power control circuit 138 controls the excitation light powers of the LDs 121 and 122 on the basis of the detection result of the loss change amount which is started in step S1004 and the determination result of the loss location which is started in step S1006.

The control circuit 130 according to the first embodiment may determine the loss location caused by the fiber bending or the like on the basis of the combination of the loss change amount of the transmission path 101 and the backscattering amount and may control the excitation light powers on the basis of the combination of the determined loss location and the loss change amount. With this configuration, even when the loss caused by the fiber bending or the like occurs in any location on the transmission path 101, it is possible to suppress the fluctuation in the wavelength characteristic of the Raman gain. For example, it is possible to maintain the wavelength characteristic of the Raman gain to be stable.

For example, a bending loss may be generated when an operator erroneously bends the fiber in any location of the transmission path 101 during the operation of the transmission system 100. If the bending loss is generated in the vicinity of the reception end at this time, less excitation light power is input to the transmission path 101 to decrease the Raman gain, and as illustrated in FIG. 2 and FIG. 3, the gain variation is generated. If the bending loss is generated in the vicinity of the transmission end, the excitation light sufficiently attenuates by the loss of the transmission path 101 and has reduced power at a level where Raman amplification does not occur, and the presence or absence of the bending loss does not affect the Raman gain.

When the optical loss caused by the fiber bending or the like in any location of the transmission path 101 is generated, the Raman gain changes in accordance with location of the optical loss. According to the control circuit 130, even when the loss caused by the fiber bending or the like occurs in any location on the transmission path 101, it is possible to suppress the fluctuation in the wavelength characteristic of the Raman gain.

An example of a control on the excitation light power by the control circuit 130 will be described. For example, a type of the transmission path 101 is dispersion shifted fiber (DSF). A loss coefficient of the transmission path 101 (loss per 1 km) is set as 0.3 dB/km. A transmission distance of the transmission path 101 is set as 100 km. The signal light transmitted from the transmission-side apparatus 110 to the reception-side apparatus 120 has an L band channel, 80 waves at 50 GHz interval, and −1 dBm/ch at the transmission end. Wavelengths of the respective excitation lights output from the LDs 121 and 122 are set as 1463 nm and 1494 nm.

To obtain a gain at 14 dB in the wavelength of the signal light in an initial state, the powers of the respective excitation lights are both set as 208 mW. The loss at 1.0 dB caused by the bending or the like at the reception end of the transmission path 101 is generated. The loss detection circuit 131 first detects the loss generation at 1.0 dB.

The backscattering detection circuit 133 detects the backscattering amount based on Rayleigh scattering. The backscattered light is observed at 0.089 mW with respect to the excitation light power at 208 mW, and it is found out that the backscattering amount is −33.7 dB.

The loss location determination circuit 136 may determine that the loss generation location is the reception end (0 km) on the basis of the loss amount at 1.0 dB, the backscattering amount at −33.7 dB, and the relationship information stored in the relationship information storage unit 135 (see FIG. 4 and FIG. 5).

The excitation light power control circuit 138 increases the excitation light power to 286 mW on the basis of the loss generation location at 0 km, the loss amount at 1.0 dB, and the relationship information stored in the relationship information storage unit 137 (see FIG. 8 and FIG. 9). With this configuration, it is possible to compensate the gain decrease caused by the excitation light attenuation because of the loss generation.

Second Embodiment

Figure 11A:
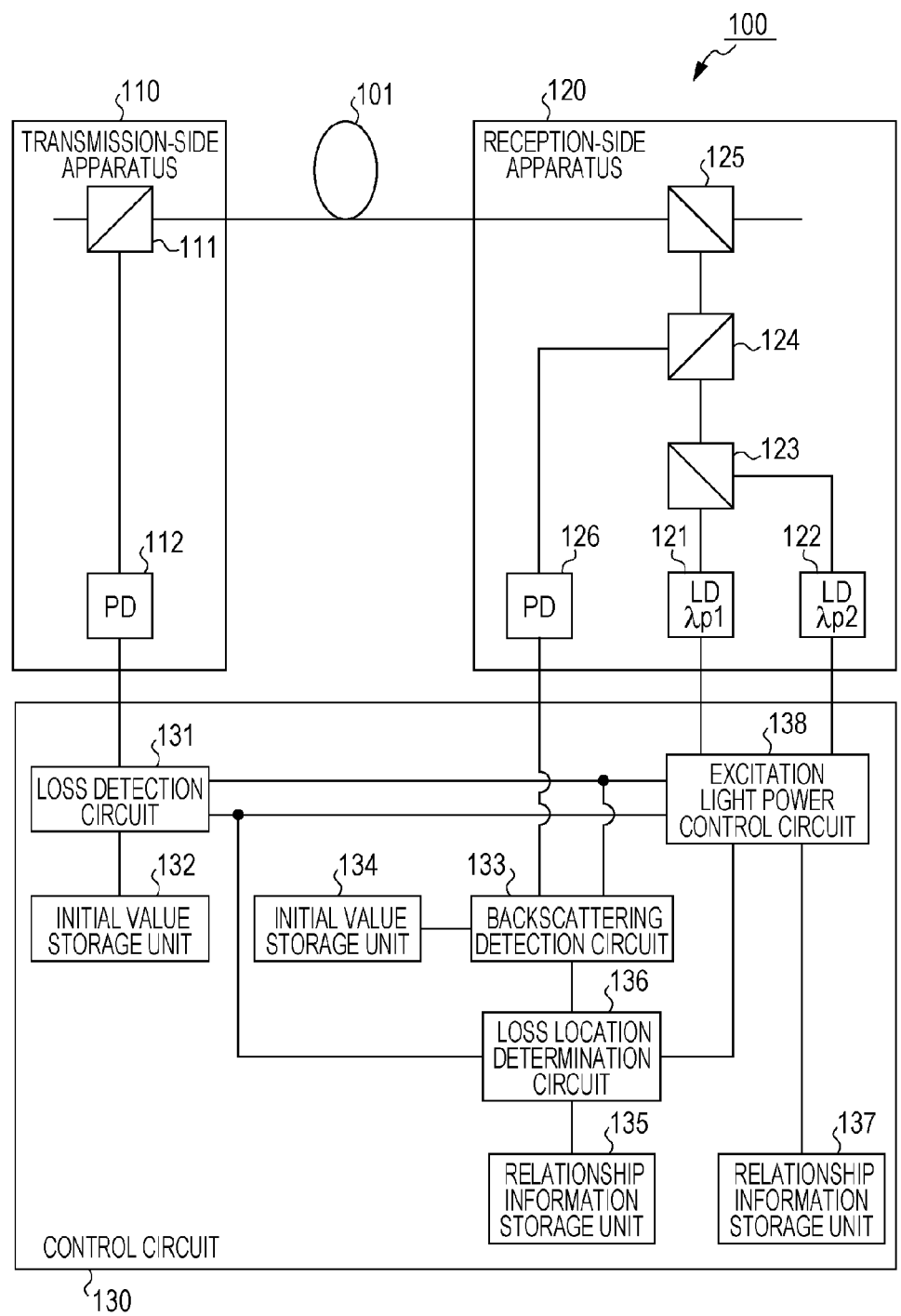
FIG. 11A illustrates a configuration example of the transmission system according to a second embodiment.
Figure 11B:
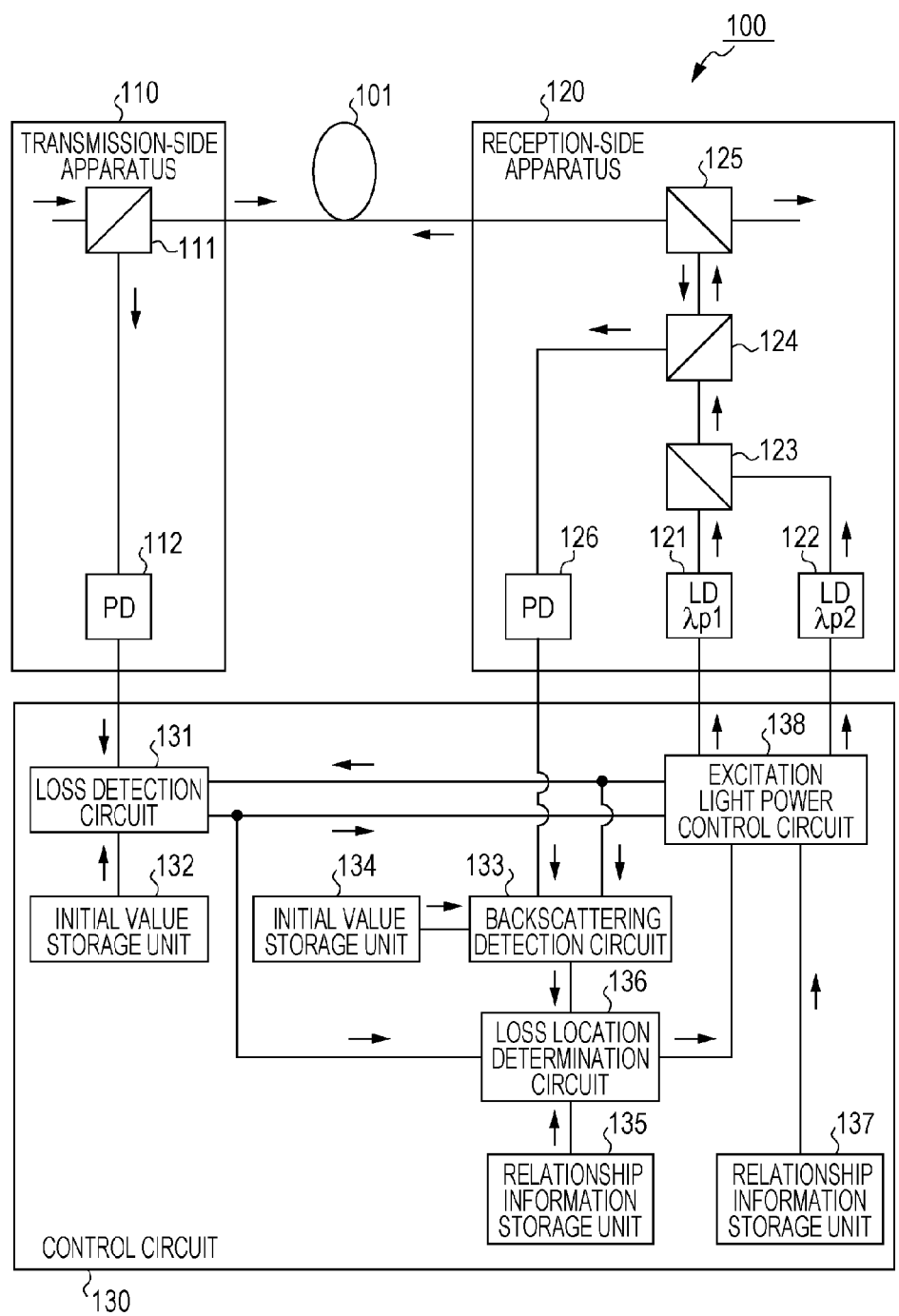
FIG. 11B illustrates an example of flows of the light and the electric signals in the transmission system illustrated in FIG. 11A.

FIG. 11A illustrates a configuration example of the transmission system according to a second embodiment. FIG. 11B illustrates an example of flows of the light and the electric signals in the transmission system illustrated in FIG. 11A. In FIG. 11A and FIG. 11B, components similar to those illustrated in FIG. 1A and FIG. 1B are assigned with same reference symbols, and a description thereof will be omitted.

As illustrated in FIG. 11A and FIG. 11B, the control circuit 130 according to the second embodiment is provided with an initial value storage unit 134 in addition to the configuration illustrated in FIG. 1A and FIG. 1B. The backscattering detection circuit 133 obtains information indicating an initial value of the backscattering amount from the initial value storage unit 134. The backscattering detection circuit 133 calculates a difference between the initial value of the backscattering amount indicated by the obtained information and the detected backscattering amount to detect a change amount (backscattering change amount) from the initial value of the backscattering amount. The backscattering detection circuit 133 outputs the information indicating the detected backscattering change amount to the loss location determination circuit 136.

The initial value storage unit 134 stores the initial value of the backscattering amount. For example, the initial value storage unit 134 stores the backscattering amount detected by the backscattering detection circuit 133 at the rise of the control circuit 130.

The relationship information storage unit 135 stores relationship information indicating a relationship between the combination of the loss change amount and the backscattering change amount and the location where the loss caused by the bending or the like of the transmission path 101 is generated. The loss location determination circuit 136 determines the location where the loss caused by the bending or the like is generated on the basis of the relationship information stored in the relationship information storage unit 135, the loss change amount indicated by the information from the loss detection circuit 131, and the backscattering change amount indicated by the information from the backscattering detection circuit 133.

The control on the excitation light power based on the detected backscattering amount may be a control on the excitation light power based on a change amount from the backscattering amount detected in the past to the currently detected backscattering amount. With this configuration, the loss location caused by the fiber bending or the like may be determined similarly as in the control circuit 130 according to the first embodiment.

FIG. 12 is a flow chart illustrating an example of the rising operation according to the second embodiment. The control circuit 130 according to the second embodiment executes, for example, the following respective steps as the rising operation. The excitation light power control circuit 138 sets the excitation light powers of the LDs 121 and 122 as predetermined initial values (step S1201).

The loss detection circuit 131 detects an initial value of the excitation light loss of the transmission path 101 on the basis of the excitation light powers set in step S1201 and the signal from the PD 112 (step S1202). The initial value storage unit 132 stores the loss initial value detected in step S1202 (step S1203).

The backscattering detection circuit 133 detects the initial value of the backscattering amount on the basis of the excitation light powers set in step S1201 and the signal from the PD 126 (step S1204). The initial value storage unit 134 stores the initial value of the backscattering amount detected in step S1204 (step S1205).

The loss detection circuit 131 starts to detect the loss change amount of the excitation light (step S1206). The loss change amount is a change mount of the excitation light loss from the initial value stored in step S1203. The backscattering detection circuit 133 starts to detect the backscattering change amount (step S1207). The backscattering change amount is a change amount of the backscattering amount from the initial value stored in step S1205.

The loss location determination circuit 136 starts to determine the loss location based on the detection result of the loss change amount which is started in step S1206 and the detection result of the backscattering change amount which is started in step S1207 (step S1208).

The excitation light power control circuit 138 starts to control the excitation light powers of the LDs 121 and 122 (step S1209) and ends the series of the rising operation. Specifically, the excitation light power control circuit 138 controls the excitation light powers of the LDs 121 and 122 on the basis of the detection result of the loss change amount which is started in step S1206 and the determination result of the loss location which is started in step S1208.

The control circuit 130 according to the second embodiment thus may determine the loss location on the basis of the combination of the loss change amount of the transmission path 101 and the backscattering change amount and control the excitation light power on the basis of the combination of the determined loss location and the loss change amount. With this configuration, even when the loss caused by the fiber bending or the like occurs in any location on the transmission path 101, it is possible to suppress the fluctuation in the wavelength characteristic of the Raman gain.

Third Embodiment

Figure 13A:
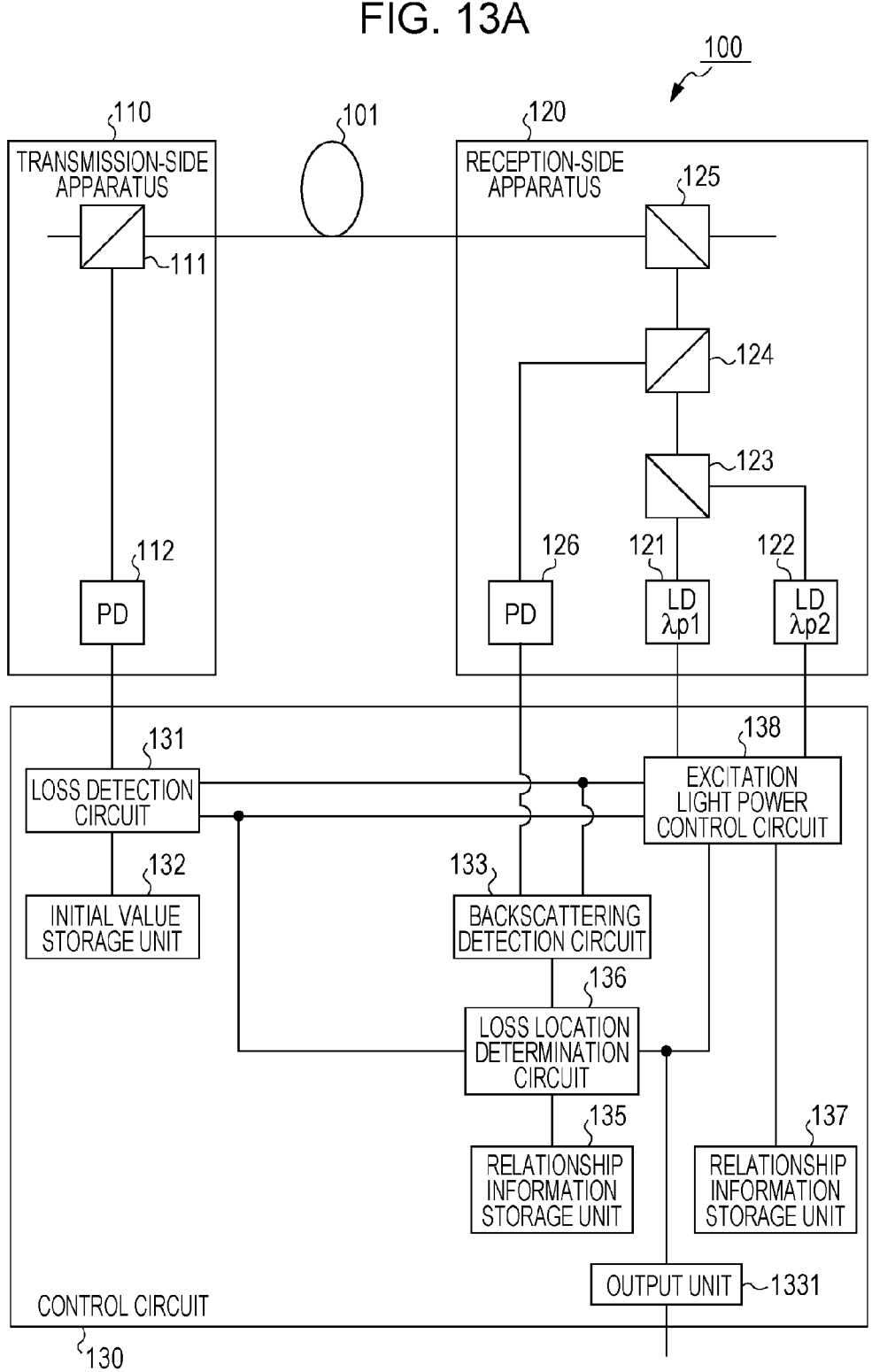
FIG. 13A illustrates a configuration example of the transmission system according to a third embodiment.
Figure 13B:
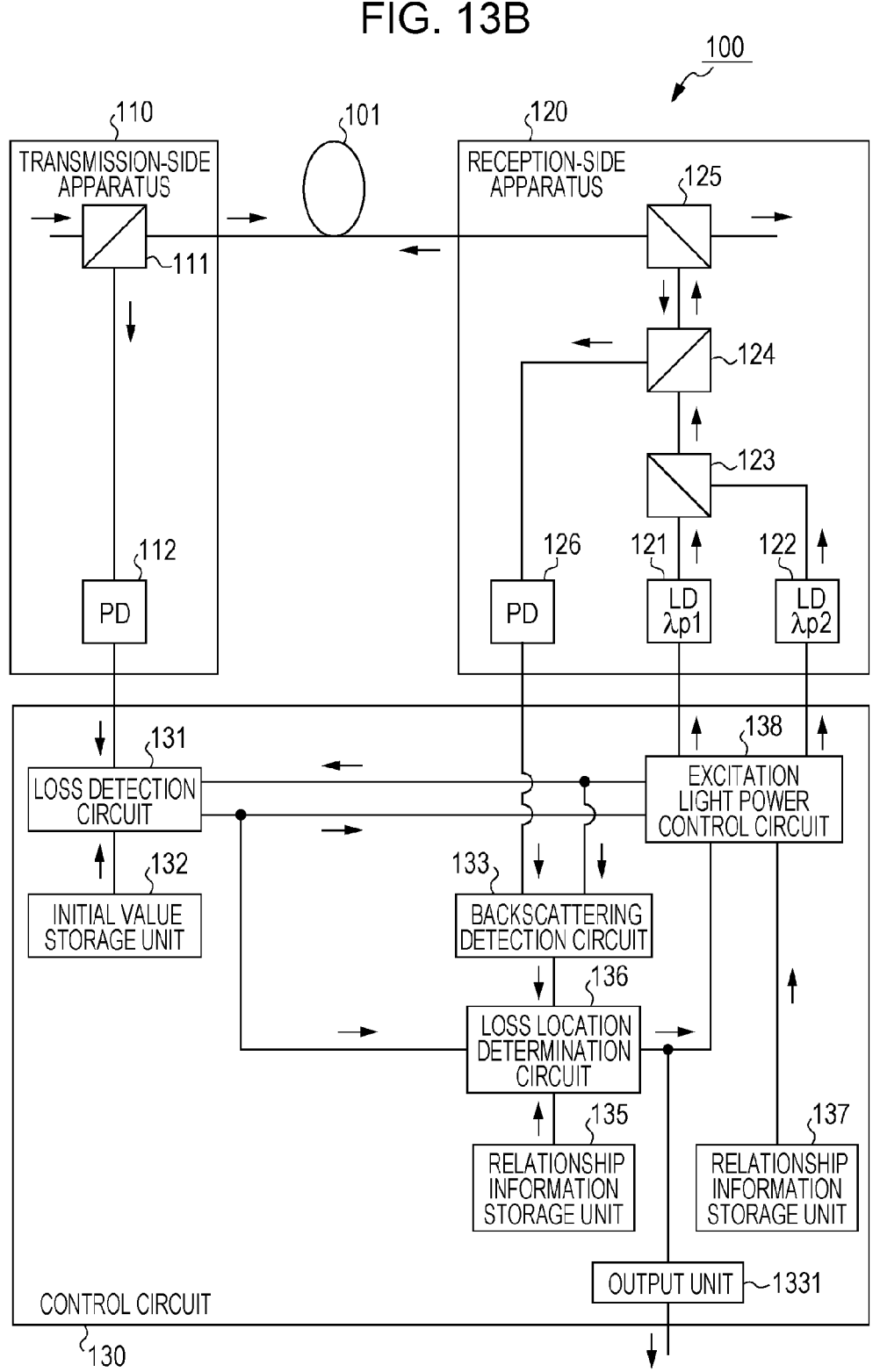
FIG. 13B illustrates an example of flows of the light and the electric signals in the transmission system illustrated in FIG. 13A.

FIG. 13A illustrates a configuration example of the transmission system according to a third embodiment. FIG. 13B illustrates an example of flows of the light and the electric signals in the transmission system illustrated in FIG. 13A. In FIG. 13A and FIG. 13B, components similar to those illustrated in FIG. 1A and FIG. 1B are assigned with same reference symbols, and a description thereof will be omitted.

As illustrated in FIG. 13A and FIG. 13B, the control circuit 130 according to the third embodiment is provided with an output unit 1331 in addition to the configuration illustrated in FIG. 1A and FIG. 1B. The output unit 1331 obtains information indicating the loss location from the loss location determination circuit 136 and outputs the obtained information. For example, the output unit 1331 outputs the obtained information to a user of the control circuit 130. The output unit 1331 may alternatively transmit the obtained information to another communication apparatus.

With this configuration, since a maintenance person of the transmission system 100 may grasp the location where the loss caused by the bending or the like is generated on the transmission path 101, it is possible to facilitate the maintenance of the transmission system 100. In the configurations illustrated in FIG. 13A and FIG. 13B, as illustrated in FIG. 11A and FIG. 11B, the loss location may also be determined on the basis of the combination of the loss change amount of the transmission path 101 and the backscattering change amount.

The control circuit 130 according to the third embodiment thus may determine the loss location on the basis of the combination of the loss change amount of the transmission path 101 and the backscattering amount (backscattering change amount) and output the information indicating the determined loss location. With this configuration, it is possible to facilitate the maintenance of the transmission system 100.

For example, the control circuit 130 may determine a location where the state change on the transmission path 101 occurs on the basis of information indicating a relationship between the combination of the change amount of the optical loss and the amount of the backscattered light and the location where the state change on the transmission path 101 occurs.

Fourth Embodiment

Figure 14A:
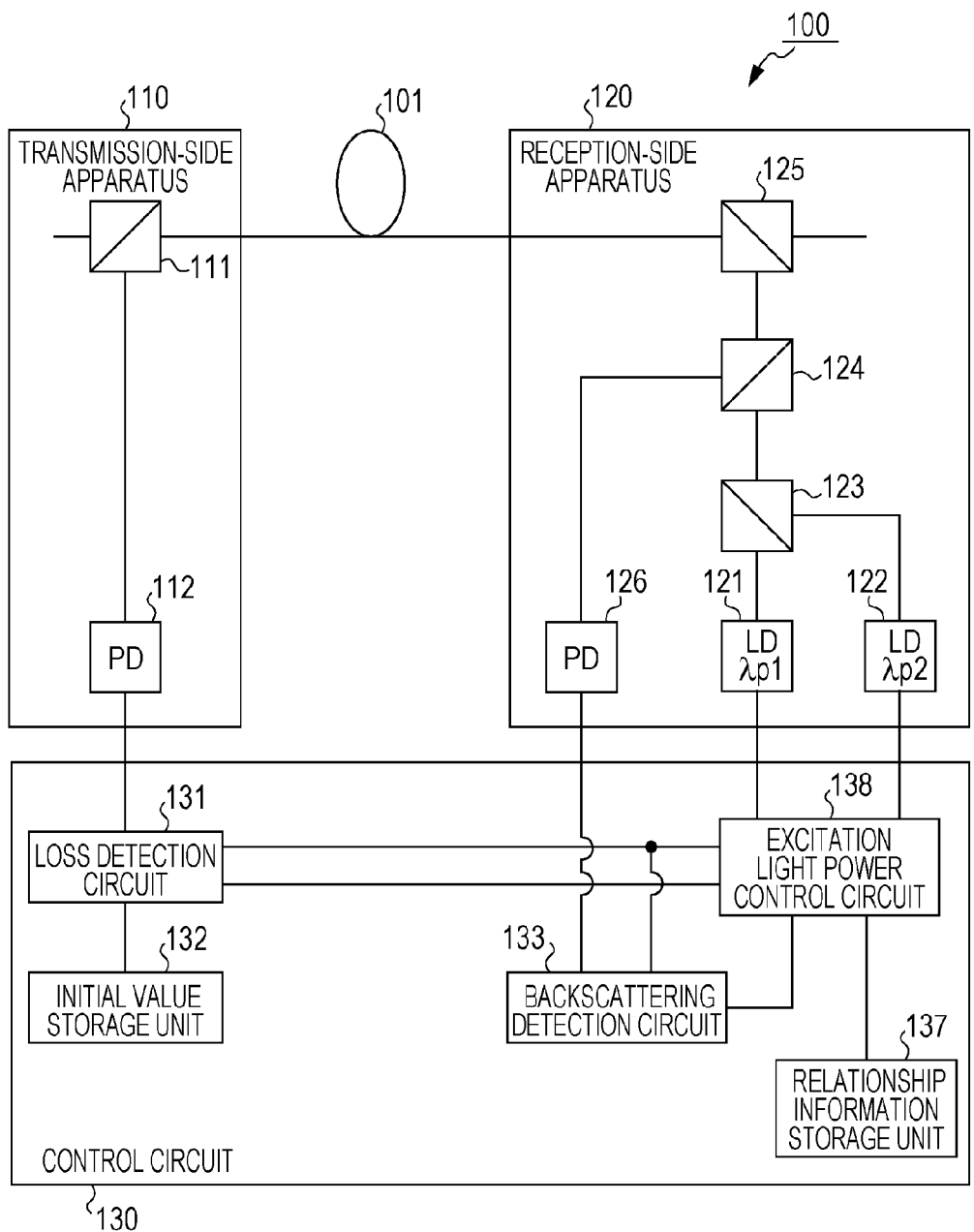
FIG. 14A illustrates a configuration example of the transmission system according to a fourth embodiment.
Figure 14B:
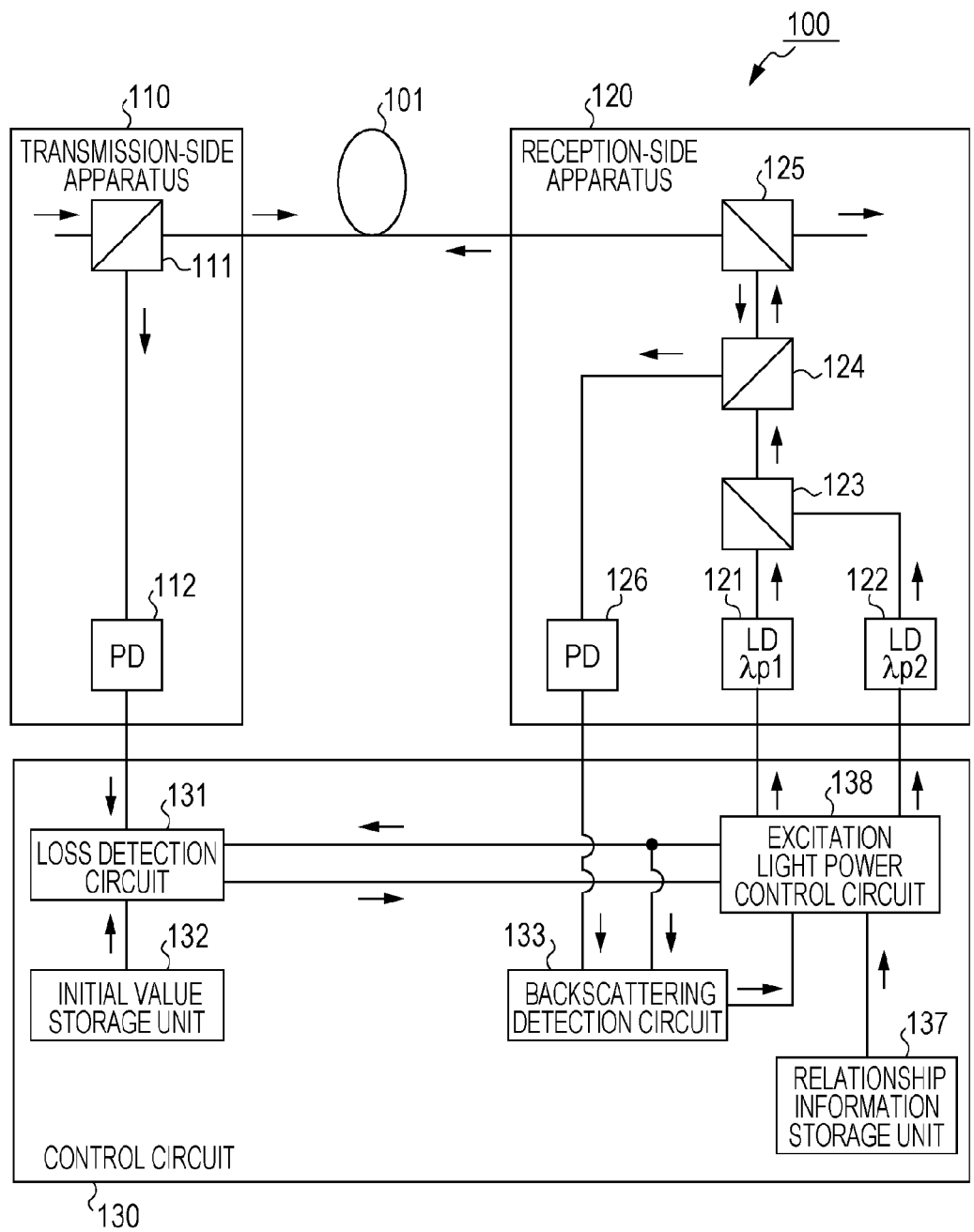
FIG. 14B illustrates an example of flows of the light and the electric signals in the transmission system illustrated in FIG. 14A.

FIG. 14A illustrates a configuration example of the transmission system according to a fourth embodiment. FIG. 14B illustrates an example of flows of the light and the electric signals in the transmission system illustrated in FIG. 14A. In FIG. 14A and FIG. 14B, components similar to those illustrated in FIG. 1A and FIG. 1B are assigned with same reference symbols, and a description thereof will be omitted.

As illustrated in FIG. 14A and FIG. 14B, the control circuit 130 may adopt a configuration obtained by removing the relationship information storage unit 135 and the loss location determination circuit 136 illustrated in FIG. 1A and FIG. 1B. The backscattering detection circuit 133 outputs information indicating the detected backscattering amount to the excitation light power control circuit 138.

The relationship information storage unit 137 stores relationship information indicating a relationship between the combination of the loss change amount and the backscattering amount and the excitation light power for maintaining the Raman gain as the fixed value. The excitation light power is, for example, the total power of the excitation lights output from the LDs 121 and 122. The excitation light power control circuit 138 derives the excitation light power on the basis of the relationship information stored in the relationship information storage unit 137, the loss change amount indicated by the information from the loss detection circuit 131, and the backscattering amount indicated by the information from the backscattering detection circuit 133.

It is possible to derive the excitation light power at which the gain is fixed by thus using the relationship information indicating the relationship between the combination of the loss change amount and the backscattering amount and the excitation light power for maintaining the Raman gain as the fixed value without the determination on the loss location.

Figure 15:
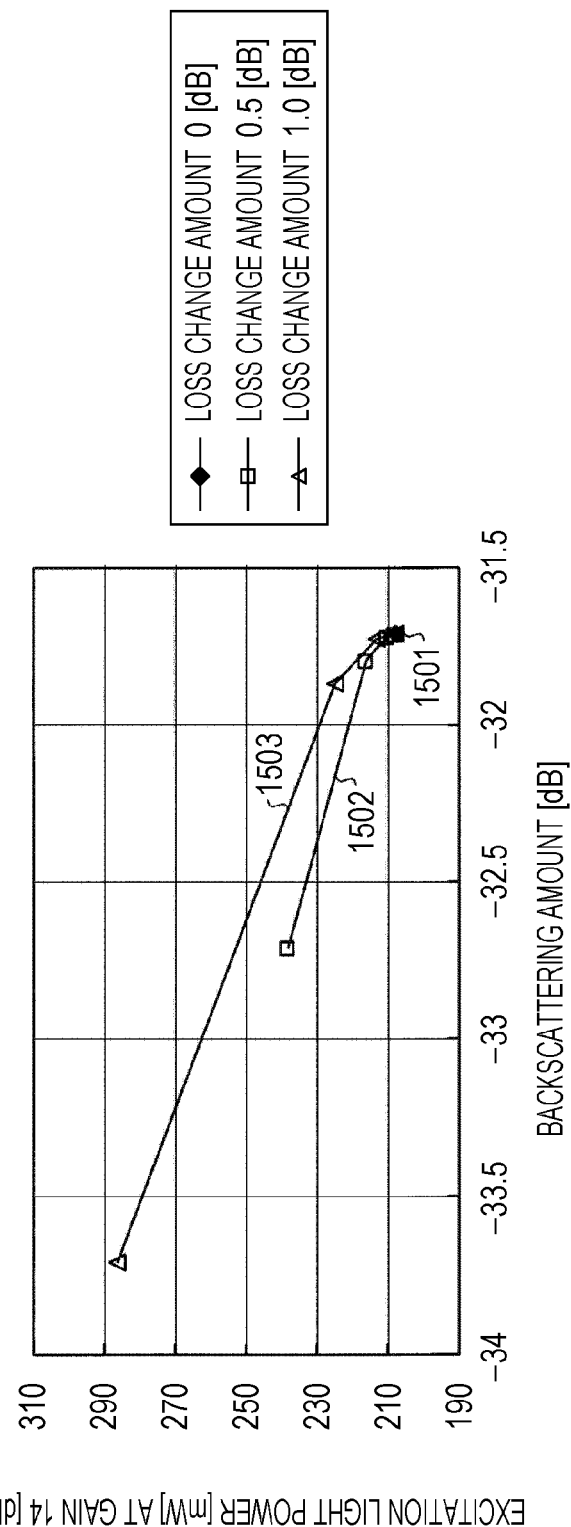
FIG. 15 illustrates an example of a relationship between the backscattering amount, the excitation light power, and the loss change amount.

FIG. 15 illustrates an example of a relationship between a backscattering amount, the excitation light power, and the loss change amount. A vertical axis of FIG. 15 represents the excitation light power [mW] for setting the gain as 14 dB. A horizontal axis of FIG. 15 represents the backscattering amount [dB]. Excitation light powers 1501 to 1503 of FIG. 15 respectively represent excitation light powers with respect to the backscattering amount in a case where the loss change amounts are 0 dB, 0.5 dB, and 1.0 dB. The excitation light powers 1501 to 1503 may be obtained, for example, from the backscattering amount characteristics 401 to 403 illustrated in FIG. 4 and the excitation light powers 801 to 803 illustrated in FIG. 8.

The relationship information storage unit 137 illustrated in FIG. 13A and FIG. 13B stores relationship information indicating the excitation light powers 1501 to 1503 of FIG. 15 in the format of a table or a function. With this configuration, the excitation light power control circuit 138 may derive the excitation light power for setting the gain to be fixed on the basis of the combination of the loss change amount and the backscattering amount and the relationship information stored in the relationship information storage unit 137.

Figure 16:
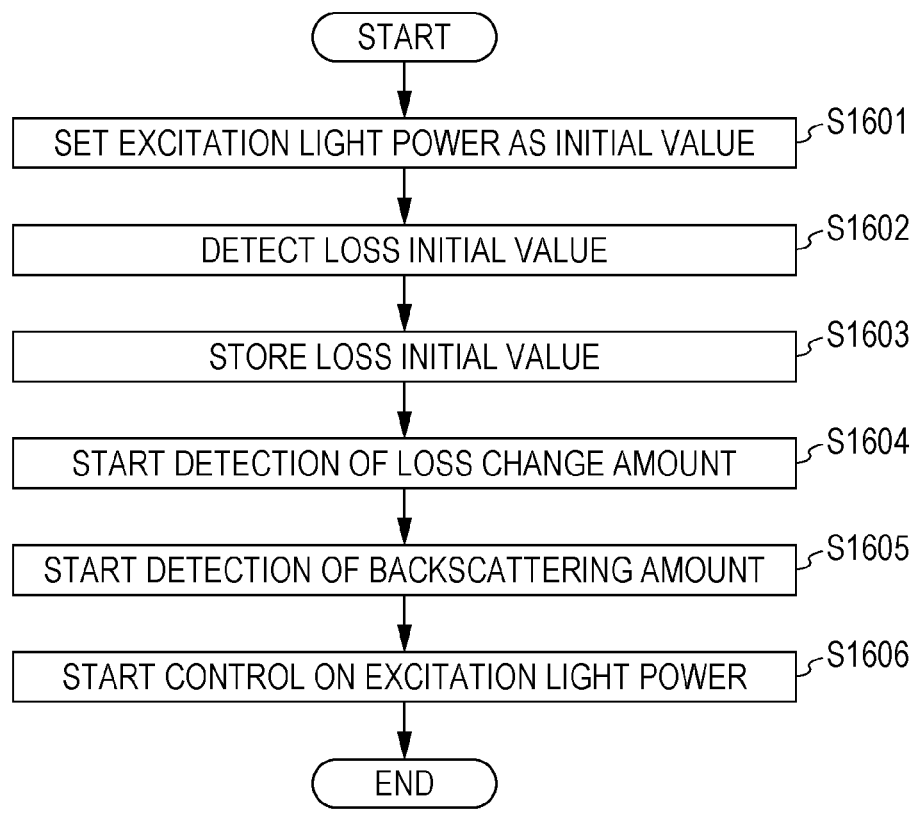
FIG. 16 is a flow chart illustrating an example of the rising operation according to the fourth embodiment.

FIG. 16 is a flow chart illustrating an example of the rising operation according to the fourth embodiment. The control circuit 130 according to the fourth embodiment executes, for example, the following respective steps as the rising operation. Steps S1601 to S1605 illustrated in FIG. 16 are similar to step S1001 to S1005 illustrated in FIG. 10.

After step S1605, the excitation light power control circuit 138 starts to control the excitation light powers of the LDs 121 and 122 (step S1606) and ends the series of the rising operation. Specifically, the excitation light power control circuit 138 controls the excitation light powers of the LDs 121 and 122 on the basis of the detection result of the loss change amount which is started in step S1604 and the detection result of the backscattering amount which is started in step S1605.

With the control circuit 130 according to the fourth embodiment, it is possible to derive the excitation light power at which the gain is fixed by using the relationship information directly indicating the relationship between the combination of the loss change amount and the backscattering amount and the excitation light power. For this reason, since the fluctuation in the wavelength characteristic of the Raman gain may be suppressed without the determination on the loss location, a processing amount in the control circuit 130 may be reduced.

Fifth Embodiment

Figure 17A:
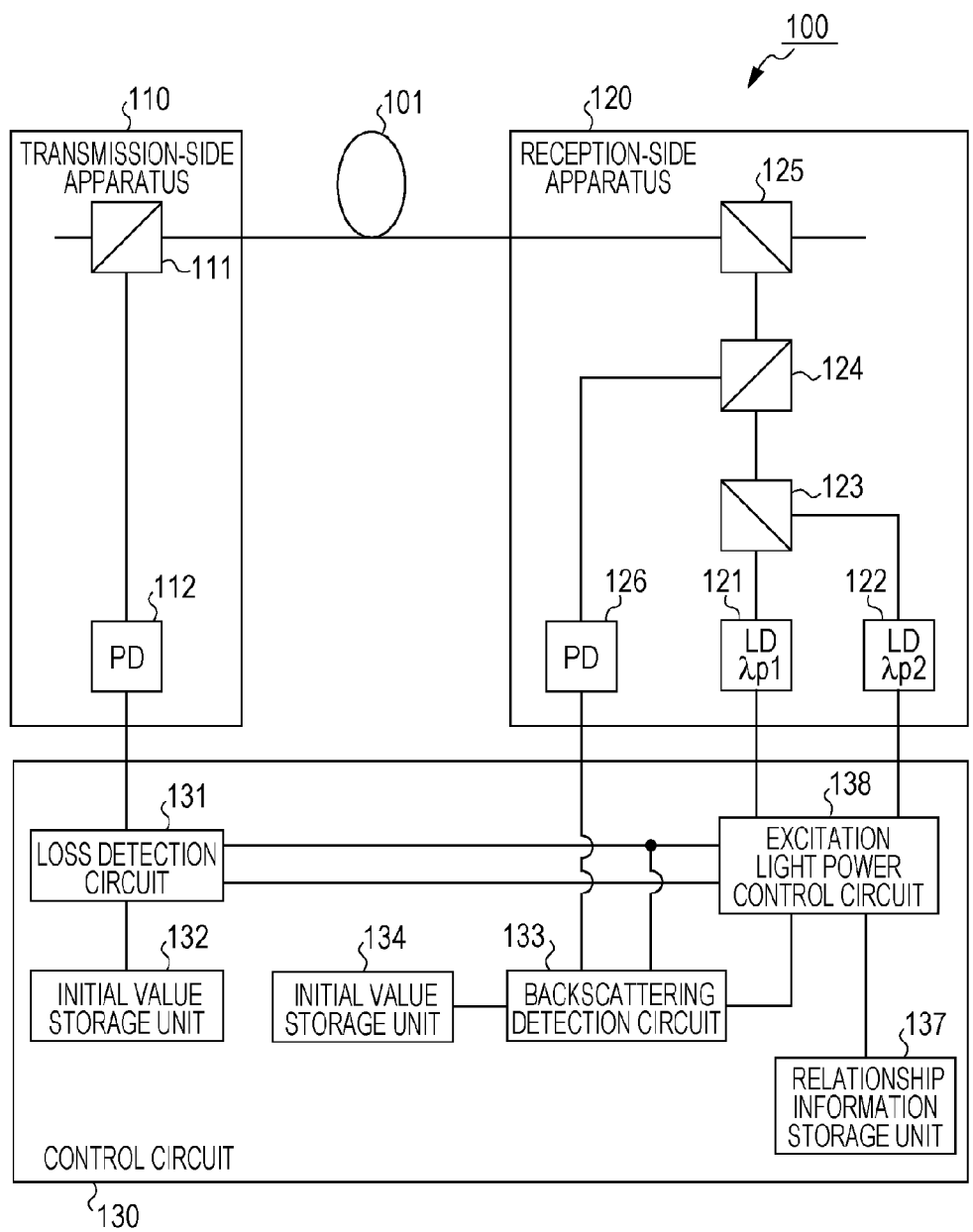
FIG. 17A illustrates a configuration example of the transmission system according to a fifth embodiment.
Figure 17B:
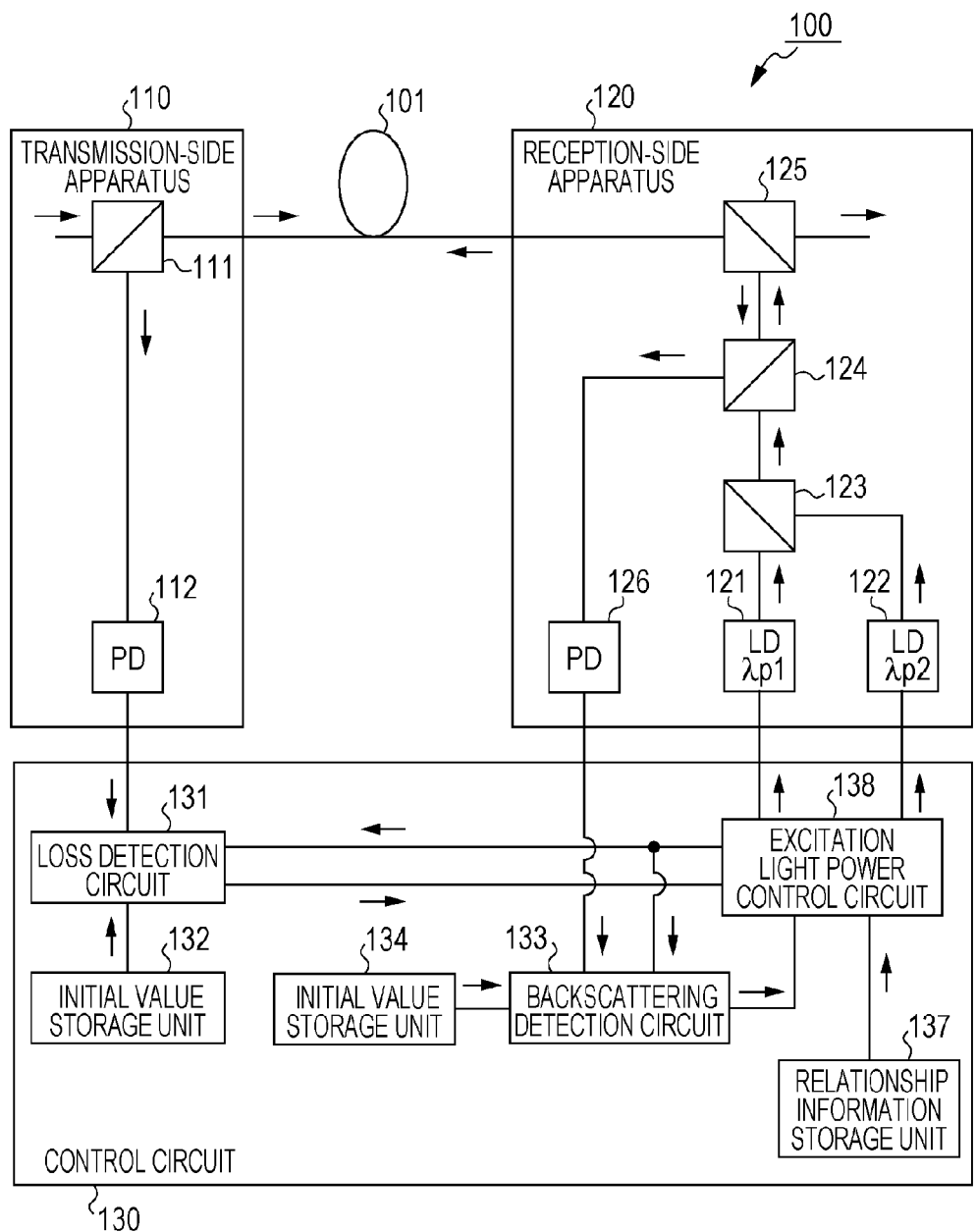
FIG. 17B illustrates an example of flows of the light and the electric signals in the transmission system illustrated in FIG. 17A.

FIG. 17A illustrates a configuration example of the transmission system according to a fifth embodiment. FIG. 17B illustrates an example of flows of the light and the electric signals in the transmission system illustrated in FIG. 17A. In FIG. 17A and FIG. 17B, components similar to those in FIG. 11A, FIG. 11B, FIG. 14A, and FIG. 14B are assigned with same reference symbols, and a description thereof will be omitted.

As illustrated in FIG. 17A and FIG. 17B, the control circuit 130 according to the fifth embodiment is provided with the initial value storage unit 134 in addition to the configuration illustrated in FIG. 14A and FIG. 14B. The backscattering detection circuit 133 detects a change amount (backscattering change amount) from the initial value of the backscattering amount. The backscattering detection circuit 133 outputs the information indicating the detected backscattering change amount to the excitation light power control circuit 138.

The relationship information storage unit 137 stores relationship information indicating a relationship between the combination of the loss change amount and the backscattering change amount and the excitation light power for maintaining the Raman gain as the fixed value. The excitation light power is, for example, the total power of the excitation lights output from the LDs 121 and 122. The excitation light power control circuit 138 derives the on the basis of the relationship information stored in the relationship information storage unit 137, the loss change amount indicated by the information from the loss detection circuit 131, and the backscattering change amount indicated by the information from the backscattering detection circuit 133.

It is possible to derive the excitation light power at which the gain is fixed by thus using the relationship information indicating the relationship between the combination of the loss change amount and the backscattering change amount and the excitation light power for maintaining the Raman gain as the fixed value without the determination on the loss location.

Figure 18:
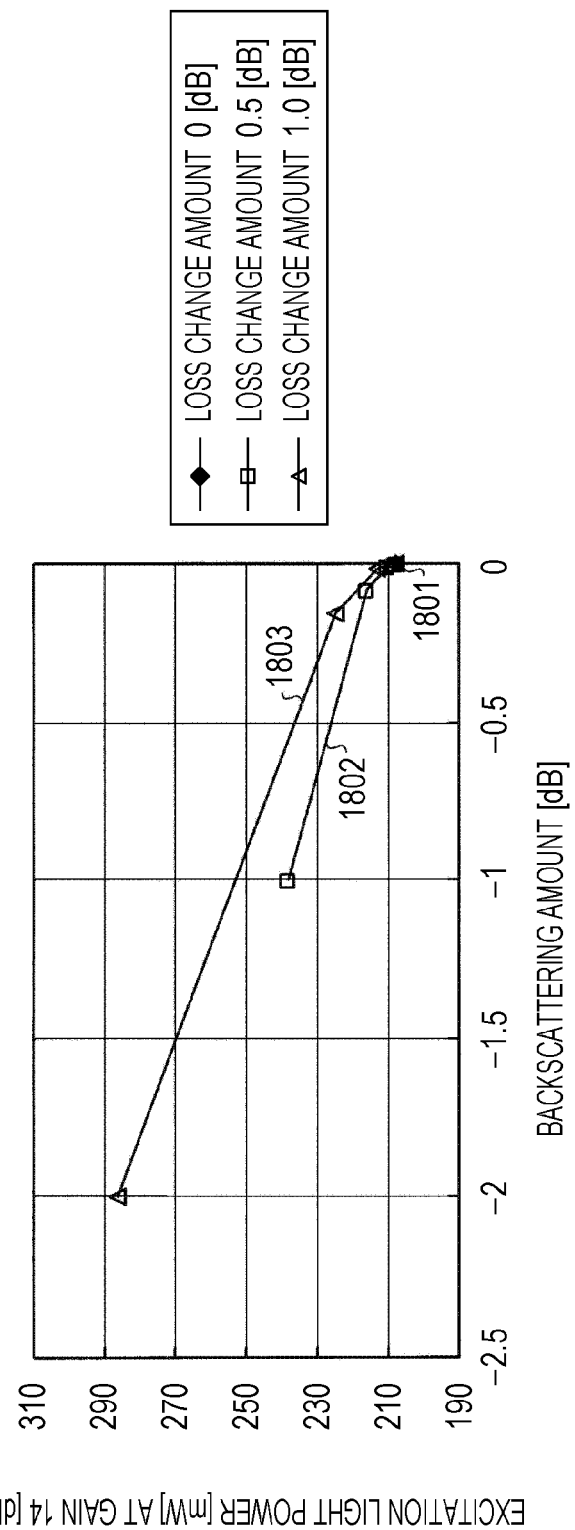
FIG. 18 illustrates an example of a relationship between a backscattering change amount, the excitation light power, and the loss change amount.

FIG. 18 illustrates an example of a relationship between a backscattering change amount, the excitation light power, and the loss change amount. A vertical axis of FIG. 18 represents the excitation light power [mW] for setting the gain as 14 dB. A horizontal axis of FIG. 18 represents the backscattering change amount [dB]. Excitation light powers 1801 to 1803 of FIG. 18 respectively represents excitation light powers with respect to the backscattering change amount in a case where the loss change amounts are 0 dB, 0.5 dB, and 1.0 dB.

The relationship information storage unit 137 illustrated in FIG. 17A and FIG. 17B stores relationship information indicating the excitation light powers 1801 to 1803 of FIG. 18 in the format of a table or a function. With this configuration, the excitation light power control circuit 138 may derive the excitation light power for setting the gain to be fixed on the basis of the combination of the loss change amount and the backscattering change amount and the relationship information stored in the relationship information storage unit 137.

FIG. 19 is a flow chart illustrating an example of the rising operation according to the fifth embodiment. The control circuit 130 according to the fifth embodiment executes, for example, the following respective steps as the rising operation. Steps S1901 to S1907 illustrated in FIG. 19 are similar to steps S1201 to S1207 illustrated in FIG. 12.

After step S1907, the excitation light power control circuit 138 starts to control the excitation light powers of the LDs 121 and 122 (step S1908) and ends the series of the rising operation. Specifically, the excitation light power control circuit 138 controls the excitation light powers of the LDs 121 and 122 on the basis of the detection result of the loss change amount which is started in step S1906 and the detection result of the backscattering change amount which is started in step S1907.

With the control circuit 130 according to the fifth embodiment, it is possible to derive the excitation light power at which the gain is fixed by thus using the relationship information indicating the relationship between the combination of the loss change amount and the backscattering change amount and the excitation light power. For this reason, since the fluctuation in the wavelength characteristic of the Raman gain may be suppressed without the determination on the loss location, it is possible to reduce the processing amount in the control circuit 130.

With the control circuit, the control method, and the transmission system described above, it is possible to suppress the fluctuation in the wavelength characteristic of the Raman gain.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control circuit for a transmission system in which signal light transmitted from a transmission-side apparatus via a transmission path to a reception-side apparatus is subjected to Raman amplification by inputting excitation light from the reception-side apparatus to the transmission path, the control circuit comprising:
    a first detection unit configured to detect a change amount of an optical loss of the transmission path, caused by a state change of the transmission path, on the basis of a difference between a difference at a first time point and a difference at a second time point following the first time point;
    a second detection unit configured to detect a backscattered light amount of the excitation light; and
    a control unit configured to control an intensity of the excitation light input by the reception-side apparatus to the transmission path on the basis of the change amount of the optical loss detected by the first detection unit and the backscattered light amount detected by the second detection unit.

2. The control circuit according to claim 1, further comprising:
    a determination unit configured to determine a location where the state change of the transmission path occurs on the basis of the change amount of the optical loss detected by the first detection unit and the backscattered light amount detected by the second detection unit; and
    an output unit configured to output information indicating the location determined by the determination unit.

3. The control circuit according to claim 1,
    wherein the first detection unit detects the change amount of the optical loss on the basis of a difference between the intensity of the excitation light input by the reception-side apparatus to the transmission path and the intensity of the excitation light input to the transmission-side apparatus via the transmission path.

4. The control circuit according to claim 1,
    wherein the second detection unit detects the backscattered light amount on the basis of an intensity of a wavelength component of the excitation light among the light input from the transmission path to the reception-side apparatus.

5. The control circuit according to claim 1,
    wherein the control unit controls the intensity of the excitation light on the basis of information indicating a relationship between a combination of the change amount of the optical loss and the backscattered light amount and the intensity of the excitation light at which a gain by the Raman amplification corresponds to a predetermined gain in the combination.

6. The control circuit according to claim 2,
    wherein the determination unit determines the location where the state change of the transmission path occurs on the basis of information indicating a relationship between a combination of the change amount of the optical loss and the backscattered light amount and the location where the state change of the transmission path occurs.

7. The control circuit according to claim 1,
    wherein the excitation light is light obtaining by multiplexing plural lights having different wavelengths with each other.

8. A control method for a transmission system in which signal light transmitted from a transmission-side apparatus via a transmission path to a reception-side apparatus is subjected to Raman amplification by inputting excitation light from the reception-side apparatus to the transmission path, the control method comprising:
- detecting a change amount of an optical loss of the transmission path, caused by a state change of the transmission path, on the basis of a difference between a difference at a first time point and a difference at a second time point following the first time point;
- detecting a backscattered light amount of the excitation light; and
- controlling an intensity of the excitation light input by the reception-side apparatus to the transmission path on the basis of the detected change amount of the optical loss and the detected backscattered light amount.

9. A transmission system comprising:
- a transmission-side apparatus configured to transmit signal light via a transmission path;
- a reception-side apparatus configured to receive the signal light transmitted by the transmission-side apparatus and perform Raman amplification on the signal light by inputting excitation light to the transmission path; and
- a control circuit configured to control an intensity of the excitation light input by the reception-side apparatus to the transmission path on the basis of a change amount of an optical loss of the transmission path caused by a state change of the transmission path and a backscattered light amount of the excitation light, the change amount of the optical loss being detected on the basis of a difference between a difference at a first time point and a difference at a second time point following the first time point.

* * * * *